(12) United States Patent
Yang et al.

(10) Patent No.: US 8,940,842 B2
(45) Date of Patent: Jan. 27, 2015

(54) METHODS FOR CONTROLLING DUAL CATALYST OLEFIN POLYMERIZATIONS

(71) Applicant: Chevron Phillips Chemical Company LP, The Woodlands, TX (US)

(72) Inventors: Qing Yang, Bartlesville, OK (US); Tony R. Crain, Niotaze, KS (US); Jerry T. Lanier, Bartlesville, OK (US); Jeff S. Fodor, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 13/625,065

(22) Filed: Sep. 24, 2012

(65) Prior Publication Data
US 2014/0088271 A1 Mar. 27, 2014

(51) Int. Cl.
| | |
|---|---|
| C08F 2/00 | (2006.01) |
| C08F 4/603 | (2006.01) |
| C08F 4/606 | (2006.01) |
| C08F 4/6192 | (2006.01) |
| C08F 4/643 | (2006.01) |
| C08F 4/646 | (2006.01) |
| C08F 210/06 | (2006.01) |

(52) U.S. Cl.
USPC ............... 526/61; 526/59; 526/114; 526/119

(58) Field of Classification Search
USPC ....................... 526/59, 61, 114, 119; 700/269
See application file for complete search history.

(56) References Cited

U.S. PATENT DOCUMENTS

| | | | |
|---|---|---|---|
| 2,825,721 | A | 3/1958 | Hogan et al. |
| 3,119,569 | A | 1/1964 | Baricordi |
| 3,225,023 | A | 12/1965 | Hogal et al. |
| 3,226,205 | A | 12/1965 | Rohlfing |
| 3,242,099 | A | 3/1966 | Manyik |
| 3,248,179 | A | 4/1966 | Norwood |
| 3,622,521 | A | 11/1971 | Hogan et al. |
| 3,625,864 | A | 12/1971 | Horvath |
| 3,887,494 | A | 6/1975 | Dietz |
| 3,900,457 | A | 8/1975 | Witt |
| 3,976,632 | A | 8/1976 | DeLap |
| 4,053,436 | A | 10/1977 | Hogan et al. |
| 4,081,407 | A | 3/1978 | Short et al. |
| 4,151,122 | A | 4/1979 | McDaniel et al. |
| 4,182,815 | A | 1/1980 | McDaniel et al. |
| 4,247,421 | A | 1/1981 | McDaniel et al. |
| 4,248,735 | A | 2/1981 | McDaniel et al. |
| 4,296,001 | A | 10/1981 | Hawley |

(Continued)

FOREIGN PATENT DOCUMENTS

EP 1669373 6/2006

OTHER PUBLICATIONS

Furian et al., Article entitled "Dual Catalyst System Composed by Nickel and Vanadium Complexes Containing Nitrogen Ligands for Ethylene Polymerization," published in the Journal of the Brazilian Chemical Society, vol. 16, No. 6a, São Paulo, Nov./Dec. 2005, 12 pages.

(Continued)

*Primary Examiner* — Fred M Teskin
(74) *Attorney, Agent, or Firm* — Merchant & Gould

(57) ABSTRACT

Methods for controlling the weight ratio of a higher molecular weight component to a lower molecular weight component of an olefin polymer are disclosed. This weight ratio can be increased as polymerization reaction temperature and/or catalyst system residence time are increased.

29 Claims, 2 Drawing Sheets

(56) References Cited

U.S. PATENT DOCUMENTS

| | | |
|---|---|---|
| 4,297,460 A | 10/1981 | McDaniel et al. |
| 4,301,034 A | 11/1981 | McDaniel |
| 4,339,559 A | 7/1982 | McDaniel |
| 4,364,842 A | 12/1982 | McDaniel et al. |
| 4,364,854 A | 12/1982 | McDaniel et al. |
| 4,364,855 A | 12/1982 | McDaniel et al. |
| 4,392,990 A | 7/1983 | Witt |
| 4,397,766 A | 8/1983 | Hawley et al. |
| 4,405,501 A | 9/1983 | Witt |
| 4,444,962 A | 4/1984 | McDaniel et al. |
| 4,444,964 A | 4/1984 | McDaniel et al. |
| 4,444,965 A | 4/1984 | McDaniel et al. |
| 4,460,756 A | 7/1984 | McDaniel et al. |
| 4,501,885 A | 2/1985 | Sherk |
| 4,504,638 A | 3/1985 | McDaniel et al. |
| 4,530,914 A * | 7/1985 | Ewen et al. ............. 502/113 |
| 4,547,557 A | 10/1985 | McDaniel |
| 4,588,790 A | 5/1986 | Jenkins |
| 4,735,931 A | 4/1988 | McDaniel et al. |
| 4,794,096 A | 12/1988 | Ewen |
| 4,806,513 A | 2/1989 | McDaniel et al. |
| 4,808,561 A | 2/1989 | Welborn |
| 4,820,785 A | 4/1989 | McDaniel et al. |
| 4,855,271 A | 8/1989 | McDaniel et al. |
| 4,939,217 A | 7/1990 | Stricklen |
| 4,981,831 A | 1/1991 | Knudsen et al. |
| 4,988,657 A | 1/1991 | Martin et al. |
| 5,037,911 A | 8/1991 | McDaniel et al. |
| 5,179,178 A | 1/1993 | Stacy et al. |
| 5,191,132 A | 3/1993 | Patsidis et al. |
| 5,210,352 A | 5/1993 | Alt et al. |
| 5,219,817 A | 6/1993 | McDaniel et al. |
| 5,221,654 A | 6/1993 | McDaniel et al. |
| 5,237,025 A | 8/1993 | Benham et al. |
| 5,244,990 A | 9/1993 | Mitchell |
| 5,275,992 A | 1/1994 | Mitchell et al. |
| 5,347,026 A | 9/1994 | Patsidis et al. |
| 5,352,749 A | 10/1994 | DeChellis |
| 5,399,636 A | 3/1995 | Alt et al. |
| 5,401,817 A | 3/1995 | Palackal et al. |
| 5,420,320 A | 5/1995 | Zenk et al. |
| 5,436,304 A | 7/1995 | Griffin |
| 5,436,305 A | 7/1995 | Alt et al. |
| 5,451,649 A | 9/1995 | Zenk et al. |
| 5,455,314 A | 10/1995 | Burns |
| 5,480,848 A | 1/1996 | Geerts |
| 5,496,781 A | 3/1996 | Geerts et al. |
| 5,498,581 A | 3/1996 | Welch et al. |
| 5,541,272 A | 7/1996 | Schmid et al. |
| 5,554,795 A | 9/1996 | Frey et al. |
| 5,563,284 A | 10/1996 | Frey et al. |
| 5,565,175 A | 10/1996 | Hottovy |
| 5,565,592 A | 10/1996 | Patsidis et al. |
| 5,571,880 A | 11/1996 | Alt et al. |
| 5,575,979 A | 11/1996 | Hanson |
| 5,576,259 A | 11/1996 | Hasegawa et al. |
| 5,594,078 A | 1/1997 | Welch et al. |
| 5,610,247 A | 3/1997 | Alt et al. |
| 5,624,877 A | 4/1997 | Bergmeister et al. |
| 5,627,247 A | 5/1997 | Alt et al. |
| 5,631,203 A | 5/1997 | Welch et al. |
| 5,631,335 A | 5/1997 | Alt et al. |
| 5,648,439 A | 7/1997 | Bergmeister et al. |
| 5,654,454 A | 8/1997 | Peifer et al. |
| 5,668,230 A | 9/1997 | Schertl et al. |
| 5,705,478 A | 1/1998 | Boime |
| 5,705,579 A | 1/1998 | Hawley et al. |
| 5,739,220 A | 4/1998 | Shamshoum et al. |
| 5,807,938 A | 9/1998 | Kaneko et al. |
| 5,869,575 A | 2/1999 | Kolthammer et al. |
| 5,919,983 A | 7/1999 | Rosen et al. |
| 6,239,235 B1 | 5/2001 | Hottovy |
| 6,262,191 B1 | 7/2001 | Hottovy |
| 6,300,271 B1 | 10/2001 | McDaniel |
| 6,355,594 B1 | 3/2002 | McDaniel |
| 6,395,666 B1 | 5/2002 | McDaniel |
| 6,548,442 B1 | 4/2003 | McDaniel |
| 6,613,712 B1 | 9/2003 | McDaniel |
| 6,653,416 B2 | 11/2003 | McDaniel et al. |
| 6,723,805 B2 | 4/2004 | Braganca et al. |
| 6,831,141 B2 | 12/2004 | McDaniel et al. |
| 6,833,338 B2 | 12/2004 | McDaniel et al. |
| 6,833,415 B2 | 12/2004 | Kendrick |
| 6,884,856 B2 | 4/2005 | Benazouzz et al. |
| 7,106,437 B2 | 9/2006 | Marrow et al. |
| 7,226,886 B2 | 6/2007 | Jayaratne et al. |
| 7,294,599 B2 | 11/2007 | Jensen et al. |
| 7,312,283 B2 | 12/2007 | Martin et al. |
| 7,417,097 B2 | 8/2008 | Yu et al. |
| 7,585,923 B2 | 9/2009 | Sandell et al. |
| 7,601,665 B2 | 10/2009 | McDaniel et al. |
| 7,601,783 B2 | 10/2009 | Davis et al. |
| 7,619,047 B2 * | 11/2009 | Yang et al. ............. 526/116 |
| 7,705,094 B2 | 4/2010 | Hutchette et al. |
| 7,786,227 B2 | 8/2010 | Buchelli et al. |
| 7,884,163 B2 | 2/2011 | McDaniel et al. |
| 7,919,639 B2 | 4/2011 | Murray et al. |
| 8,003,740 B2 | 8/2011 | Mihan et al. |
| 8,080,681 B2 | 12/2011 | Murray et al. |
| 8,088,867 B2 | 1/2012 | Jiang et al. |
| 8,114,946 B2 | 2/2012 | Yang et al. |
| 2004/0059070 A1 | 3/2004 | Whitte et al. |
| 2004/0242808 A1 * | 12/2004 | Mink et al. ............. 526/59 |
| 2007/0060722 A1 | 3/2007 | Jayaratne et al. |
| 2008/0108763 A1 * | 5/2008 | Hoang et al. ............. 526/113 |

OTHER PUBLICATIONS

Hawley's Condensed Chemical Dictionary, 11th Ed., John Wiley & Sons, 1995, 3 pages.
Cotton et al., Advanced Inorganic Chemistry, 6th Ed., Wiley-Interscience, 1999, 4 pages.
International Patent Application PCT/US2013/059961 Search Report dated Nov. 21, 2013.

* cited by examiner

US 8,940,842 B2

METHODS FOR CONTROLLING DUAL CATALYST OLEFIN POLYMERIZATIONS

BACKGROUND OF THE INVENTION

There are various methods that can be employed to adjust or control the relative amounts of the higher molecular weight component and the lower molecular weight component of a polymer produced using a dual catalyst system. For instance, the catalyst composition and/or the reactant composition can be changed to vary the relative amounts of the higher molecular weight component and the lower molecular weight component that are produced. However, additional methods of adjusting or controlling the polymer components are needed which do not require changes in the catalyst composition or reactant composition. Accordingly, it is to this end that the present disclosure is directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Various processes and methods related to the control of dual catalyst olefin polymerizations are disclosed herein. In one embodiment, a polymerization process can comprise:

(1) contacting a dual catalyst system with an olefin monomer and an optional olefin comonomer in a polymerization reactor system under polymerization conditions to produce an olefin polymer, wherein the olefin polymer comprises a higher molecular weight component and a lower molecular weight component, wherein the dual catalyst system comprises a first metallocene catalyst component and a second metallocene catalyst component, and wherein the polymerization conditions comprise a reaction temperature and a dual catalyst system residence time; and (2) controlling a weight ratio of the higher molecular weight component to the lower molecular weight component by adjusting the reaction temperature and/or the dual catalyst system residence time.

A method of controlling the weight ratio of the higher molecular weight component to the lower molecular weight component of an olefin polymer is provided herein, and in this embodiment, the method can comprise:

(i) contacting a dual catalyst system with an olefin monomer and an optional olefin comonomer in a polymerization reactor system under polymerization conditions to produce the olefin polymer, wherein the dual catalyst system comprises a first metallocene catalyst component and a second metallocene catalyst component, and wherein the polymerization conditions comprise a reaction temperature and a dual catalyst system residence time; and (ii) adjusting the reaction temperature and/or the dual catalyst system residence time to control the weight ratio of the higher molecular weight component to the lower molecular weight component.

A process for producing an olefin polymer with a target weight ratio of the higher molecular weight component to the lower molecular weight component also is provided herein, and in this embodiment, the process can comprise:

(a) contacting a dual catalyst system with an olefin monomer and an optional olefin comonomer in a polymerization reactor system under polymerization conditions, wherein the dual catalyst system comprises a first metallocene catalyst component and a second metallocene catalyst component, and wherein the polymerization conditions comprise a reaction temperature and a dual catalyst system residence time; and (b) controlling the reaction temperature and/or the dual reactor catalyst system residence time to produce the olefin polymer with the target weight ratio of the higher molecular weight component to the lower molecular weight component.

Another polymerization process is disclosed herein, and in this embodiment, the process can comprise:

(1) contacting a dual catalyst system with an olefin monomer and an optional olefin comonomer in a polymerization reactor system under polymerization conditions to produce an olefin polymer, wherein the olefin polymer comprises a higher molecular weight component and a lower molecular weight component, wherein the dual catalyst system comprises a first transition metal compound, a second transition metal compound, and an activator-support, and wherein the polymerization conditions comprise a reaction temperature and a dual catalyst system residence time; and (2) controlling a weight ratio of the higher molecular weight component to the lower molecular weight component by adjusting the reaction temperature and/or the dual catalyst system residence time.

Another method of controlling the weight ratio of the higher molecular weight component to the lower molecular weight component of an olefin polymer is disclosed herein, and in this embodiment, the method can comprise:

(i) contacting a dual catalyst system with an olefin monomer and an optional olefin comonomer in a polymerization reactor system under polymerization conditions to produce the olefin polymer, wherein the dual catalyst system comprises a first transition metal compound, a second transition metal compound, and an activator-support, and wherein the polymerization conditions comprise a reaction temperature and a dual catalyst system residence time; and (ii) adjusting the reaction temperature and/or the dual catalyst system residence time to control the weight ratio of the higher molecular weight component to the lower molecular weight component.

Another process for producing an olefin polymer with a target weight ratio of the higher molecular weight component to the lower molecular weight component is disclosed herein, and in this embodiment, the process can comprise:

(a) contacting a dual catalyst system with an olefin monomer and an optional olefin comonomer in a polymerization reactor system under polymerization conditions, wherein the dual catalyst system comprises a first transition metal compound, a second transition metal compound, and an activator-support, and wherein the polymerization conditions comprise a reaction temperature and a dual catalyst system residence time; and (b) controlling the reaction temperature and/or the dual reactor catalyst system residence time to produce the olefin polymer with the target weight ratio of the higher molecular weight component to the lower molecular weight component.

In these methods and processes, the weight ratio of the higher molecular weight component to the lower molecular weight component can increase as the reaction temperature is increased and/or the weight ratio of the higher molecular weight component to the lower molecular weight component can increase as the catalyst system residence time is increased.

Both the foregoing summary and the following detailed description provide examples and are explanatory only. Accordingly, the foregoing summary and the following detailed description should not be considered to be restrictive. Further, features or variations may be provided in addition to those set forth herein. For example, certain embodiments may be directed to various feature combinations and sub-combinations described in the detailed description.

DEFINITIONS

Figure 1:
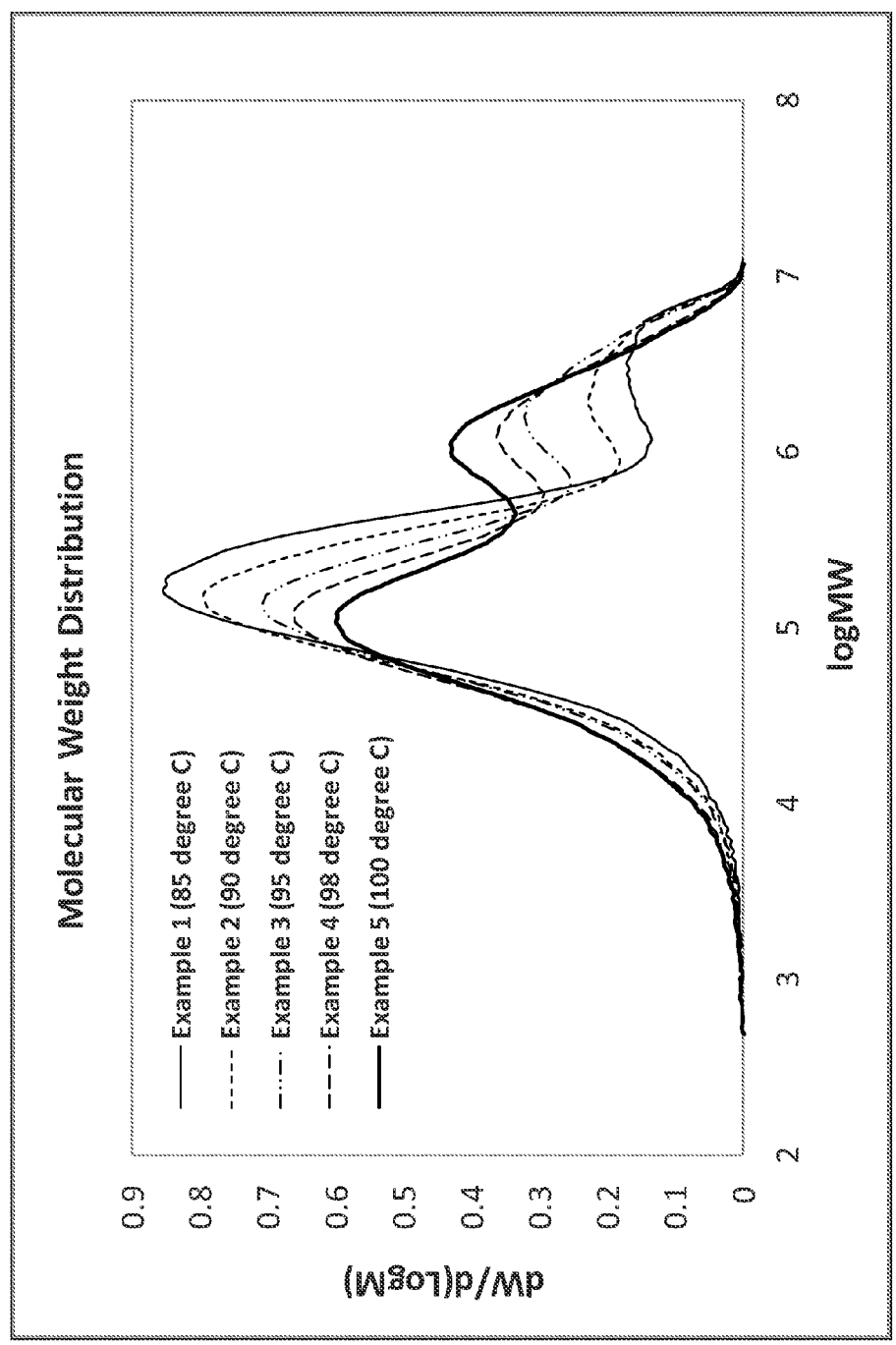
FIG. 1 presents a plot of the molecular weight distribution as a function of the polymerization reaction temperature for Examples 1-5.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Regarding claim transitional terms or phrases, the transitional term "comprising," which is synonymous with "including," "containing," "having," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claim. A "consisting essentially of" claim occupies a middle ground between closed claims that are written in a "consisting of" format and fully open claims that are drafted in a "comprising" format. Absent an indication to the contrary, describing a compound or composition as "consisting essentially of" is not to be construed as "comprising," but is intended to describe the recited component that includes materials which do not significantly alter the composition or method to which the term is applied. For example, a feedstock consisting essentially of a material A can include impurities typically present in a commercially produced or commercially available sample of the recited compound or composition. When a claim includes different features and/or feature classes (for example, a method step, feedstock features, and/or product features, among other possibilities), the transitional terms comprising, consisting essentially of, and consisting of apply only to the feature class to which it is utilized, and it is possible to have different transitional terms or phrases utilized with different features within a claim. For example, a method can comprise several recited steps (and other non-recited steps), but utilize a system preparation consisting of specific components; alternatively, consisting essentially of specific components; or alternatively, comprising the specific components and other non-recited components.

While compositions and methods are often described in terms of "comprising" various components or steps, the compositions and methods can also "consist essentially of" or "consist of" the various components or steps, unless stated otherwise.

The terms "a," "an," and "the" are intended to include plural alternatives, e.g., at least one. For instance, the disclosure of "an activator," "an olefin comonomer," etc., is meant to encompass one, or mixtures or combinations of more than one, activator, olefin comonomer, etc., unless otherwise specified.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. A general reference to pentane, for example, includes n-pentane, 2-methylbutane, and 2,2-dimethylpropane; and a general reference to a butyl group includes a n-butyl group, a sec-butyl group, an iso-butyl group, and a t-butyl group.

Also, unless otherwise specified, any carbon-containing group or compound for which the number of carbon atoms is not specified can have 1, 2, 3, 4, 5, 6, 7, 8, 9, 10, 11, 12, 13, 14, 15, 16, 17, 18, 19, or 20 carbon atoms, or any range or combination of ranges between these values. For example, unless otherwise specified, any carbon-containing group or compound can have from 1 to 20 carbon atoms, from 1 to 18 carbon atoms, from 1 to 12 carbon atoms, from 1 to 8 carbon atoms, from 2 to 20 carbon atoms, from 2 to 12 carbon atoms, from 2 to 8 carbon atoms, or from 2 to 6 carbon atoms, and the like. Moreover, other identifiers or qualifying terms can be utilized to indicate the presence of, or absence of, a particular substituent, a particular regiochemistry, and/or stereochemistry, or the presence of absence of a branched underlying structure or backbone. Any specific carbon-containing group is limited according to the chemical and structural requirements for that specific group, as understood by one of ordinary skill.

Other numerical ranges are disclosed herein. When Applicants disclose or claim a range of any type, Applicants' intent is to disclose or claim individually each possible number that such a range could reasonably encompass, including end points of the range as well as any sub-ranges and combinations of sub-ranges encompassed therein, unless otherwise specified. As a representative example, Applicants disclose that a weight ratio of the higher molecular weight component to the lower molecular weight component can be in a range from about 1:10 to about 10:1 in certain embodiments. By a disclosure that the weight ratio of the higher molecular weight component to the lower molecular weight component can be in a range from about 1:10 to about 10:1, Applicants intend to recite that the weight ratio can be equal to about 1:10, about 1:9, about 1:8, about 1:7, about 1:6, about 1:5, about 1:4, about 1:3, about 1:2, about 1:1, about 2:1, about 3:1, about 4:1, about 5:1, about 6:1, about 7:1, about 8:1, about 9:1, or about 10:1. Additionally, the weight ratio can be within any range from about 1:10 to about 10:1 (for example, the weight ratio can be in a range from about 1:2 to about 2:1), and this also includes any combination of ranges between about 1:10 and 10:1. Likewise, all other ranges disclosed herein should be interpreted in a manner similar to these examples.

Applicants reserve the right to proviso out or exclude any individual members of any such group, including any subranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

The term "substituted" when used to describe a group or a chain of carbon atoms, for example, when referring to a substituted analog of a particular group or chain, is intended to describe or group or chain wherein any non-hydrogen moiety formally replaces a hydrogen in that group or chain, and is intended to be non-limiting. A group or chain also can be referred to herein as "unsubstituted" or by equivalent terms such as "non-substituted," which refers to the original group or chain. "Substituted" is intended to be non-limiting and can include hydrocarbon substituents as specified and as understood by one of ordinary skill in the art.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon).

The term "alkane" whenever used in this specification and claims refers to a saturated hydrocarbon compound. Other identifiers can be utilized to indicate the presence of particular groups in the alkane (e.g., halogenated alkane indicates the presence of one or more halogen atoms replacing an equivalent number of hydrogen atoms in the alkane). The term "alkyl group" is used herein in accordance with the definition specified by IUPAC: a univalent group formed by removing a hydrogen atom from an alkane. An "alkyl group" and an "alkane" can be linear or branched unless otherwise specified. Primary, secondary, and tertiary alkyl groups can be derived by removal of a hydrogen atom from a primary, secondary, and tertiary carbon atom, respectively, of an alkane. The n-alkyl group can be derived by removal of a hydrogen atom from a terminal carbon atom of a linear alkane. The groups $RCH_2$ ($R \neq H$), $R_2CH$ ($R \neq H$), and $R_3C$ ($R \neq H$) are primary, secondary, and tertiary alkyl groups, respectively. The carbon atom by which indicated moiety is attached is a secondary, tertiary, and quaternary carbon atom, respectively.

The term "polymer" is used herein generically to include olefin homopolymers, copolymers, terpolymers, and so forth. A copolymer can be derived from an olefin monomer and one olefin comonomer, while a terpolymer can be derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer could be categorized an as ethylene/1-hexene copolymer. The term "polymer" also is meant to include all molecular weight polymers, and is inclusive of lower molecular weight polymers or oligomers. Applicants intend for the term "polymer" to encompass oligomers derived from any olefin monomer disclosed herein (as well from an olefin monomer and one olefin comonomer, an olefin monomer and two olefin comonomers, and so forth).

In like manner, the scope of the term "polymerization" includes homopolymerization, copolymerization, terpolymerization, etc., as well as processes that might also be referred to as oligomerization processes. Therefore, a copolymerization process would involve contacting an olefin monomer (e.g., ethylene) and an olefin comonomer (e.g., 1-hexene) to produce an olefin copolymer.

The terms "catalyst composition," "catalyst mixture," "catalyst system," and the like, do not depend upon the actual product or composition resulting from the contact or reaction of the initial components of the claimed catalyst composition/mixture/system, the nature of the active catalytic site, or the fate of the co-catalyst, the transition metal compound(s) or metallocene compound(s), any olefin monomer used to prepare a precontacted mixture, or the activator (e.g., activator-support), after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, may be used interchangeably throughout this disclosure.

The terms "contact product," "contacting," and the like, are used herein to describe compositions wherein the components are contacted together in any order, in any manner, and for any length of time. For example, the components can be contacted by blending or mixing. Further, unless otherwise specified, the contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can, and often does, include reaction products, it is not required for the respective components to react with one another. Likewise, "contacting" two or more components can result in a reaction product or a reaction mixture. Consequently, depending upon the circumstances, a "contact product" can be a mixture, a reaction mixture, or a reaction product.

Although any methods and materials similar or equivalent to those described herein can be used in the practice or testing of the invention, the typical methods and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

DETAILED DESCRIPTION OF THE INVENTION

Disclosed herein are processes and methods directed to controlling the weight ratio of the higher molecular weight component to the lower molecular weight component of an olefin polymer. Dual catalyst systems often can be employed, and typically, one catalyst component of the dual catalyst system can produce primarily the higher molecular weight component and the other catalyst component can produce primarily the lower molecular weight component. The polymerization reaction can be conducted in a reactor system which can contain one reactor, or alternatively, two or more reactors in series or parallel.

In one embodiment, a polymerization process is disclosed. In this embodiment, the polymerization process can comprise:

(1) contacting a dual catalyst system with an olefin monomer and an optional olefin comonomer in a polymerization reactor system under polymerization conditions to produce an olefin polymer, wherein the olefin polymer comprises a higher molecular weight component and a lower molecular weight component, wherein the dual catalyst system comprises a first metallocene catalyst component and a second metallocene catalyst component, and wherein the polymerization conditions comprise a reaction temperature and a dual catalyst system residence time; and (2) controlling a weight ratio of the higher molecular weight component to the lower molecular weight component by adjusting the reaction temperature and/or the dual catalyst system residence time.

In another embodiment, a method of controlling the weight ratio of the higher molecular weight component to the lower molecular weight component of an olefin polymer is disclosed. In this embodiment, the method can comprise:

(i) contacting a dual catalyst system with an olefin monomer and an optional olefin comonomer in a polymerization reactor system under polymerization conditions to produce the olefin polymer, wherein the dual catalyst system comprises a first metallocene catalyst component and a second metallocene catalyst component, and wherein the polymerization conditions comprise a reaction temperature and a dual catalyst system residence time; and (ii) adjusting the reaction temperature and/or the dual catalyst system residence time to control the weight ratio of the higher molecular weight component to the lower molecular weight component.

In yet another embodiment, a process for producing an olefin polymer with a target weight ratio of the higher molecular weight component to the lower molecular weight component is disclosed. In this embodiment, the process can comprise:

(a) contacting a dual catalyst system with an olefin monomer and an optional olefin comonomer in a polymerization reactor system under polymerization conditions, wherein the dual catalyst system comprises a first metallocene catalyst component and a second metallocene catalyst component, and wherein the polymerization conditions comprise a reaction temperature and a dual catalyst system residence time; and (b) controlling the reaction temperature and/or the dual reactor catalyst system residence time to produce the olefin polymer with the target weight ratio of the higher molecular weight component to the lower molecular weight component.

Generally, the features of the processes and methods disclosed herein (e.g., the dual catalyst system, the first metallocene catalyst component, the second metallocene component, the olefin monomer, the olefin comonomer, the polymerization conditions, the reaction temperature, the residence time (also referred to as reaction time), the polymerization reactor system, the weight ratio of the higher molecular weight component to the lower molecular weight component, among others) are independently described herein, and these features can be combined in any combination to further describe the disclosed processes and methods.

The weight ratio of the first metallocene catalyst component to the second metallocene catalyst component in the dual catalyst system generally is not limited to any particular range of weight ratios. Nonetheless, in some embodiments, the weight ratio of the first metallocene catalyst component to the second metallocene catalyst component can be in a range of from about 1:100 to about 100:1, from about 1:50 to about 50:1, from about 1:25 to about 25:1, from about 1:10 to about 10:1, or from about 1:5 to about 5:1. Accordingly, suitable ranges for the weight ratio of the first metallocene catalyst component to the second metallocene catalyst component can include, but are not limited to, from about 1:15 to about 15:1, from about 1:10 to about 10:1, from about 1:8 to about 8:1, from about 1:5 to about 5:1, from about 1:4 to about 4:1, from about 1:3 to about 3:1, from about 1:2 to about 2:1, from about 1:1.8 to about 1.8:1, from about 1:1.5 to about 1.5:1, from about 1:1.3 to about 1.3:1, from about 1:1.25 to about 1.25:1, from about 1:1.2 to about 1.2:1, from about 1:1.15 to about 1.15:1, from about 1:1.1 to about 1.1:1, or from about 1:1.05 to about 1.05:1, and the like.

Consistent with embodiments disclosed herein, the weight ratio of the first metallocene catalyst component to the second metallocene catalyst component can be held substantially constant (e.g., within +/−5%), for example, for the production of a particular polymer grade. In such circumstances, the polymerization reaction temperature and catalyst residence time can be used to control, adjust, fine-tine, etc., the production and properties of that particular polymer grade. Additionally, other polymerization process parameters also can be varied, if necessary.

Optionally, if additional control parameters for the dual catalyst polymerization process are desired other than process parameters, such as reaction temperature and residence time, the methods and processes disclosed herein can further comprise a step of adjusting the weight ratio of the first metallocene catalyst component to the second metallocene catalyst component.

Another polymerization process consistent with embodiments disclosed herein can comprise:

(1) contacting a dual catalyst system with an olefin monomer and an optional olefin comonomer in a polymerization reactor system under polymerization conditions to produce an olefin polymer, wherein the olefin polymer comprises a higher molecular weight component and a lower molecular weight component, wherein the dual catalyst system comprises a first transition metal compound, a second transition metal compound, and an activator-support, and wherein the polymerization conditions comprise a reaction temperature and a dual catalyst system residence time; and (2) controlling a weight ratio of the higher molecular weight component to the lower molecular weight component by adjusting the reaction temperature and/or the dual catalyst system residence time.

Another method of controlling the weight ratio of the higher molecular weight component to the lower molecular weight component of an olefin polymer consistent with embodiments disclosed herein can comprise:

(i) contacting a dual catalyst system with an olefin monomer and an optional olefin comonomer in a polymerization reactor system under polymerization conditions to produce the olefin polymer, wherein the dual catalyst system comprises a first transition metal compound, a second transition metal compound, and an activator-support, and wherein the polymerization conditions comprise a reaction temperature and a dual catalyst system residence time; and (ii) adjusting the reaction temperature and/or the dual catalyst system residence time to control the weight ratio of the higher molecular weight component to the lower molecular weight component.

Another process for producing an olefin polymer with a target weight ratio of the higher molecular weight component to the lower molecular weight component consistent with embodiments disclosed herein can comprise:

(a) contacting a dual catalyst system with an olefin monomer and an optional olefin comonomer in a polymerization reactor system under polymerization conditions, wherein the dual catalyst system comprises a first transition metal compound, a second transition metal compound, and an activator-support, and wherein the polymerization conditions comprise a reaction temperature and a dual catalyst system residence time; and (b) controlling the reaction temperature and/or the dual reactor catalyst system residence time to produce the olefin polymer with the target weight ratio of the higher molecular weight component to the lower molecular weight component.

Generally, the features of the processes and methods disclosed herein (e.g., the dual catalyst system, the first transition metal compound, the second transition metal compound, the activator-support, the olefin monomer, the olefin comonomer, the polymerization conditions, the reaction temperature, the residence time (also referred to as reaction time), the polymerization reactor system, the weight ratio of the higher molecular weight component to the lower molecular weight component, among others) are independently described herein, and these features can be combined in any combination to further describe the disclosed processes and methods.

The weight ratio of the first transition metal compound to the second transition metal compound in the dual catalyst system generally is not limited to any particular range of weight ratios. Nonetheless, in some embodiments, the weight ratio of the first transition metal compound to the second transition metal compound can be in a range of from about 1:100 to about 100:1, from about 1:50 to about 50:1, from about 1:25 to about 25:1, from about 1:10 to about 10:1, or from about 1:5 to about 5:1. Accordingly, suitable ranges for the weight ratio of the first transition metal compound to the second transition metal compound can include, but are not limited to, from about 1:15 to about 15:1, from about 1:10 to about 10:1, from about 1:8 to about 8:1, from about 1:5 to about 5:1, from about 1:4 to about 4:1, from about 1:3 to about 3:1, from about 1:2 to about 2:1, from about 1:1.8 to about 1.8:1, from about 1:1.5 to about 1.5:1, from about 1:1.3 to about 1.3:1, from about 1:1.25 to about 1.25:1, from about 1:1.2 to about 1.2:1, from about 1:1.15 to about 1.15:1, from about 1:1.1 to about 1.1:1, or from about 1:1.05 to about 1.05:1, and the like.

Consistent with embodiments disclosed herein, the weight ratio of the first transition metal compound to the second transition metal compound can be held substantially constant (e.g., within +/−5%), for example, for the production of a particular polymer grade. In such circumstances, the polymerization reaction temperature and catalyst residence time can be used to control, adjust, fine-tine, etc., the production and properties of that particular polymer grade. Additionally, other polymerization process parameters also can be varied, if necessary.

Optionally, if additional control parameters for the dual catalyst polymerization process are desired other than process parameters, such as reaction temperature and residence time, the methods and processes disclosed herein can further comprise a step of adjusting the weight ratio of the first transition metal compound to the second transition metal compound.

In each of the methods and process disclosed herein, the weight ratio of the higher molecular weight component to the lower molecular weight component can increase as the reaction temperature increases and/or the weight ratio of the higher molecular weight component to the lower molecular weight component can increase as the dual catalyst system residence time (or reaction time) increases.

Moreover, in these processes and methods, the reaction temperature can be adjusted or controlled (e.g., increased, decreased), or the catalyst system residence time can be adjusted or controlled (e.g., increased, decreased), or both the reaction temperature and the residence time (or reaction time) can be adjusted or controlled (e.g., increased, decreased).

Unexpectedly, in these processes and methods, the weight ratio of the higher molecular weight component to the lower molecular weight component can increase as the reaction temperature is increased. The reaction temperature, or polymerization temperature, can be any suitable temperature depending upon the type of polymerization reactor(s) employed in the reactor system, the desired olefin polymer, and the like, amongst other variables. Generally, however, the reaction temperature can be in a range from about 25° C. to about 280° C., for example, from about 50° C. to about 280° C., from about 60° C. to about 200° C., from about 60° C. to about 150° C., or from about 60° C. to about 125° C. In certain embodiments, the reaction temperature can be in a range from about 60° C. to about 120° C.; alternatively, from about 60° C. to about 110° C.; alternatively, from about 70° C. to about 120° C.; alternatively, from about 70° C. to about 110° C.; alternatively, from about 80° C. to about 120° C.; alternatively, from about 80° C. to about 110° C.; alternatively, from about 80° C. to about 105° C.; or alternatively, from about 85° C. to about 115° C.

Also unexpectedly, the weight ratio of the higher molecular weight component to the lower molecular weight component can increase as the catalyst system residence time (or reaction time) is increased. The residence time can be any suitable residence time depending upon the type of polymerization reactor(s) employed in the reactor system, the number of polymerization reactors, the desired olefin polymer, the polymer production rate, and the like, amongst other variables. Generally, however, the residence time can be in a range from about 5 min to about 5 hr, for example, from about 5 min to about 4 hr, from about 10 min to about 4 hr, from about 15 min to about 4 hr, or from about 15 min to about 3 hr. In certain embodiments, the residence time can be in a range from about 10 min to about 3 hr; alternatively, from about 10 min to about 2 hr; alternatively, from about 10 min to about 90 min; alternatively, from about 10 min to about 75 min; alternatively, from about 15 min to about 2 hr; alternatively, from about 15 min to about 90 min; alternatively, from about 15 min to about 1 hr; or alternatively, from about 20 min to about 1 hr.

In these processes and methods, the weight ratio of the higher molecular weight component to the lower molecular weight component generally is not limited to any particular range of weight ratios. Nonetheless, in some embodiments, the weight ratio of the higher molecular weight component to the lower molecular weight component can be in a range of from about 1:100 to about 100:1, from about 1:50 to about 50:1, from about 1:25 to about 25:1, from about 1:10 to about 10:1, or from about 1:5 to about 5:1. Accordingly, suitable ranges for the weight ratio of the higher molecular weight component to the lower molecular weight component can include, but are not limited to, from about 1:15 to about 15:1, from about 1:10 to about 10:1, from about 1:8 to about 8:1, from about 1:5 to about 5:1, from about 1:4 to about 4:1, from about 1:3 to about 3:1, from about 1:2 to about 2:1, from about 1:1.8 to about 1.8:1, from about 1:1.5 to about 1.5:1, from about 1:1.3 to about 1.3:1, from about 1:1.25 to about 1.25:1, from about 1:1.2 to about 1.2:1, from about 1:1.15 to about 1.15:1, from about 1:1.1 to about 1.1:1, or from about 1:1.05 to about 1.05:1, and the like.

For the production of a particular grade of an olefin polymer, with certain desired polymer properties, a target weight ratio of the higher molecular weight component to the lower molecular weight component can be established. Thus, when the particular polymer grade is produced, variables can be adjusted in order to achieve the targeted weight ratio. Accordingly, in some embodiments, the processes and methods provided herein optionally can further comprise the steps of determining (or measuring) the weight ratio of the higher molecular weight component to the lower molecular weight component, and then adjusting the reaction temperature and/or the catalyst system residence time based on the difference between the measured weight ratio and the target weight ratio. As a representative example, if the measured weight ratio is different from that of the target weight ratio for the production of a particular grade of olefin polymer, then the reaction temperature and/or the residence time can be adjusted (increased or decreased as needed) to make the measured weight ratio equivalent to that of the target weight ratio.

In certain embodiments, for instance, where the polymerization reactor system contains a slurry reactor (one or more than one), the reactor % solids can be in a range from about 25 to about 70 wt. %, or from about 30 to about 65 wt. %. For example, the reactor % solids can be in a range from about 30 to about 60 wt. %; alternatively, from about 30 to about 55 wt. %; alternatively, from about 35 to about 65 wt. %; alternatively, from about 35 to about 60 wt. %; alternatively, from about 35 to about 55 wt. %; alternatively, from about 40 to about 60 wt. %; alternatively, from about 40 to about 55 wt. %; or alternatively, from about 40 to about 50 wt. %.

Consistent with embodiments disclosed herein, the polymerization conditions that can be adjusted and/or controlled in the processes and methods described herein can be the polymerization reaction temperature and/or the residence time (or reaction time) of the dual catalyst system. However, other polymerization conditions or process variables can be adjusted and/or controlled during the operation of a polymerization reactor system, and such conditions or variables can include, but are not limited to, reactor pressure, catalyst system flow rate into the reactor, monomer flow rate (and comonomer, if employed) into the reactor, olefin polymer output rate, recycle rate, hydrogen flow rate (if employed), reactor cooling status, slurry density, circulation pump power, and the like.

In some embodiments, discussed in greater detail herein below, the olefin polymer can comprise an ethylene copolymer, for example, an ethylene/α-olefin copolymer such as an ethylene/1-hexene copolymer. In these embodiments, the density of the ethylene copolymer can be controlled by adjusting the weight ratio of the higher molecular weight component to the lower molecular weight component and, in addition, by adjusting the molar ratio of ethylene to the olefin comonomer (e.g., molar ratio of ethylene to 1-hexene, if producing an ethylene/1-hexene copolymer).

In one embodiment, no hydrogen is added to the polymerization reactor system. As one of ordinary skill in the art would recognize, hydrogen can be generated in-situ by the first and/or second metallocene catalyst component (or by the first and/or second transition metal compound) during the dual catalyst olefin polymerization process. In this embodiment, there is no "added hydrogen" to the reactor system.

Although not required, however, hydrogen can be added to the polymerization reactor system in certain embodiments. Optionally, for instance, the methods and processes provided herein can further comprise a step of a step of adding hydrogen to the polymerization reactor system to adjust a molecular weight parameter (e.g., weight-average molecular weight (Mw), number-average molecular weight (Mn), Mw/Mn, etc.) of the olefin polymer, and/or to adjust the melt index (MI) of the olefin polymer, if desired. Generally, the step of adding hydrogen can decrease the Mw (and/or Mn), and/or increase the MI of the polymer. Moreover, in addition to the impact of the reaction temperature and residence time on the weight ratio of the higher molecular weight component to the lower molecular weight component of the polymer, the step of adding hydrogen, in some embodiments, can increase the weight ratio of the higher molecular weight component to the lower molecular weight component.

In embodiments where hydrogen is added to the polymerization reactor system, the hydrogen addition can be held substantially constant (e.g., within +/−20%), for example, for the production of a particular polymer grade. For example, the ratio of hydrogen to the olefin monomer in the polymerization process can be controlled, often by the feed ratio of hydrogen to the olefin monomer entering the reactor. Further, the addition of comonomer (or comonomers) can be, and generally is, substantially constant throughout the polymerization run for a particular copolymer grade. However, in other embodiments, it is contemplated that monomer, comonomer (or comonomers), and/or hydrogen can be periodically pulsed to the reactor, for instance, in a manner similar to that employed in U.S. Pat. No. 5,739,220 and U.S. Patent Publication No. 2004/0059070, the disclosures of which are incorporated herein by reference in their entirety.

Catalyst Systems

In some embodiments, the dual catalyst system can comprise a first metallocene catalyst component and a second metallocene catalyst component. The first metallocene catalyst component and the second metallocene catalyst component independently can comprise, for example, a transition metal (one or more than one) from Groups IIIB-VIIIB of the Periodic Table of the Elements. In one embodiment, the first metallocene catalyst component and the second metallocene catalyst component independently system can comprise a Group III, IV, V, or VI transition metal, or a combination of two or more transition metals. The first metallocene catalyst component and the second metallocene catalyst component independently can comprise chromium, titanium, zirconium, hafnium, vanadium, or a combination thereof, or can comprise titanium, zirconium, hafnium, or a combination thereof, in other embodiments. Accordingly, the first metallocene catalyst component and the second metallocene catalyst component independently can comprise titanium, or zirconium, or hafnium, either singly or in combination.

In an embodiment, the first metallocene catalyst component can produce the lower molecular weight component of the olefin polymer, and the second metallocene catalyst component can produce the higher molecular weight component of the olefin polymer. These component terms are relative, are used in reference to each other, and are not limited to the actual molecular weights of the respective components.

While not being limited thereto, the first metallocene catalyst component can comprise an unbridged metallocene compound (e.g., with zirconium or hafnium) such as those described in U.S. Pat. No. 7,619,047, the disclosure of which is incorporated herein by reference in its entirety.

In another embodiment, the first metallocene catalyst component can produce the lower molecular weight component of the olefin polymer, and the first metallocene catalyst component can comprise zirconium, or alternatively, hafnium. Representative and non-limiting examples of metallocene compounds that can be employed as the first metallocene compound can include, but are not limited to, the following (Ph=phenyl):

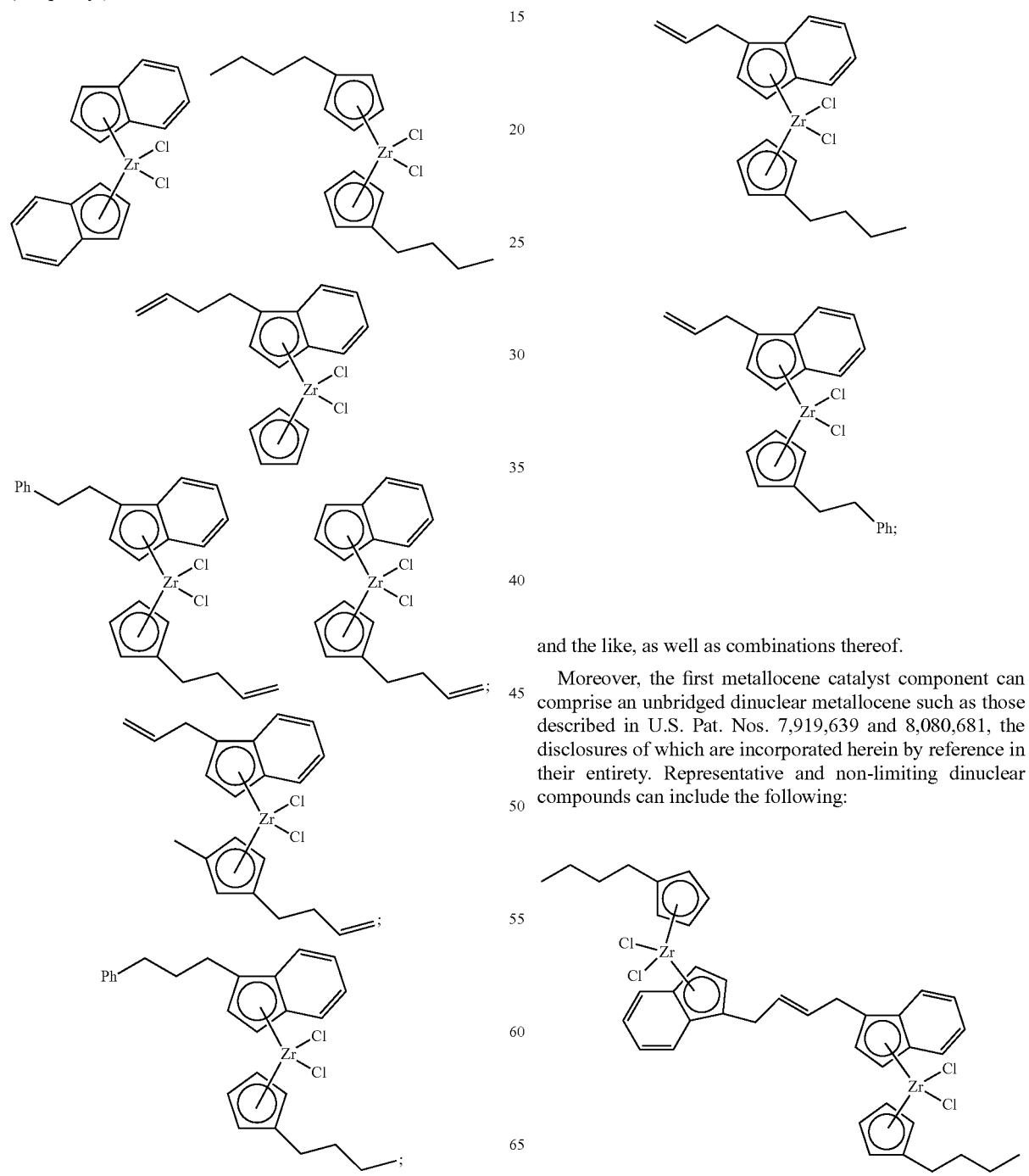

and the like, as well as combinations thereof.

Moreover, the first metallocene catalyst component can comprise an unbridged dinuclear metallocene such as those described in U.S. Pat. Nos. 7,919,639 and 8,080,681, the disclosures of which are incorporated herein by reference in their entirety. Representative and non-limiting dinuclear compounds can include the following:

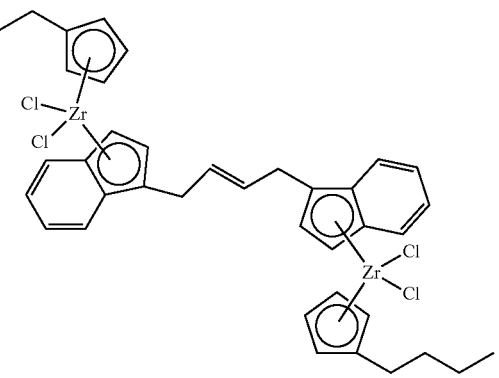

15
-continued
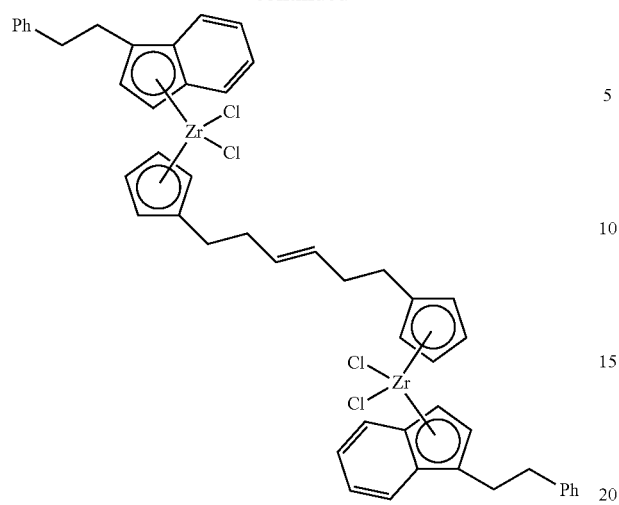
16
-continued
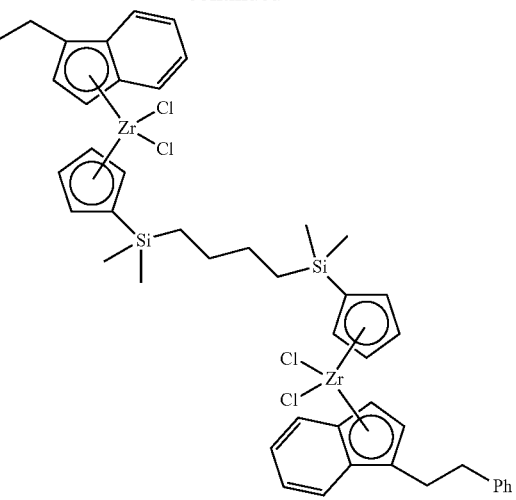
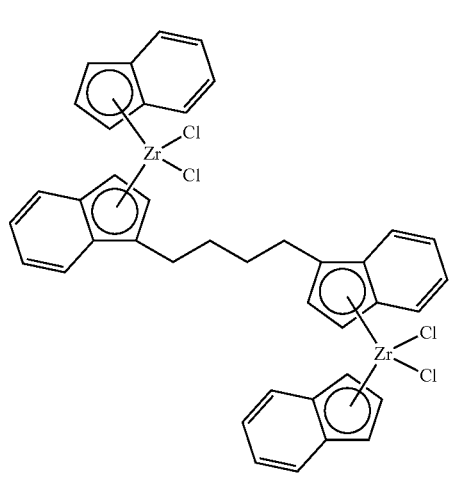
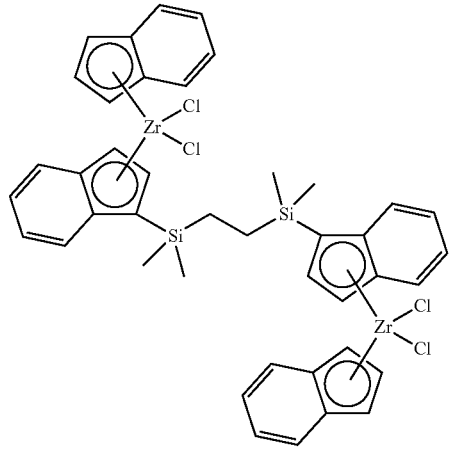

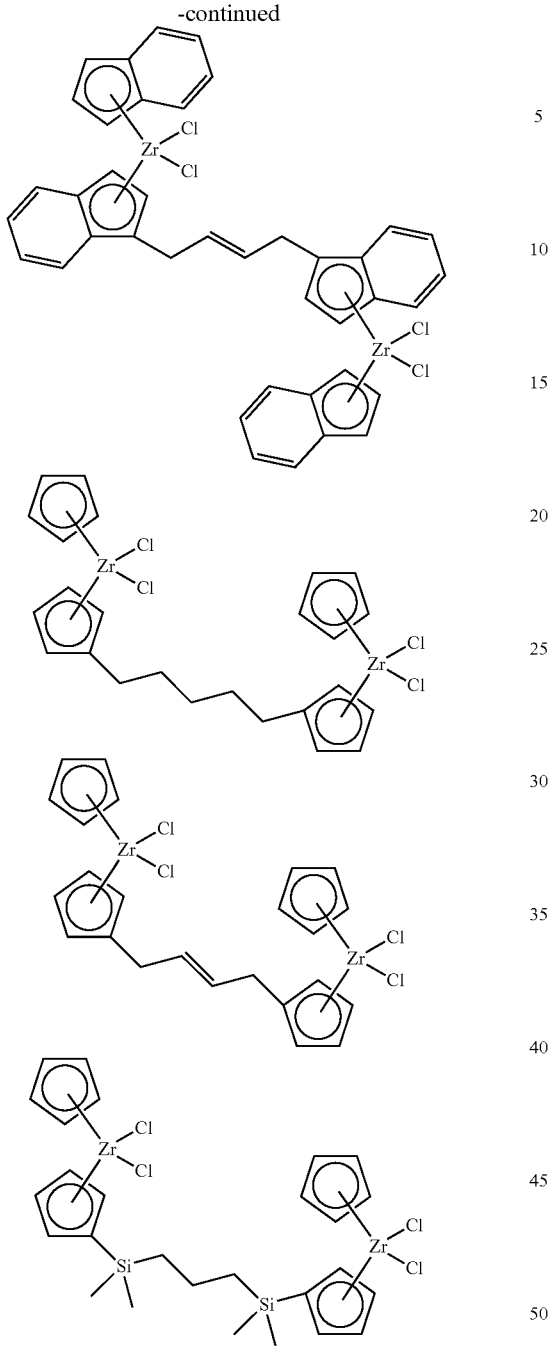
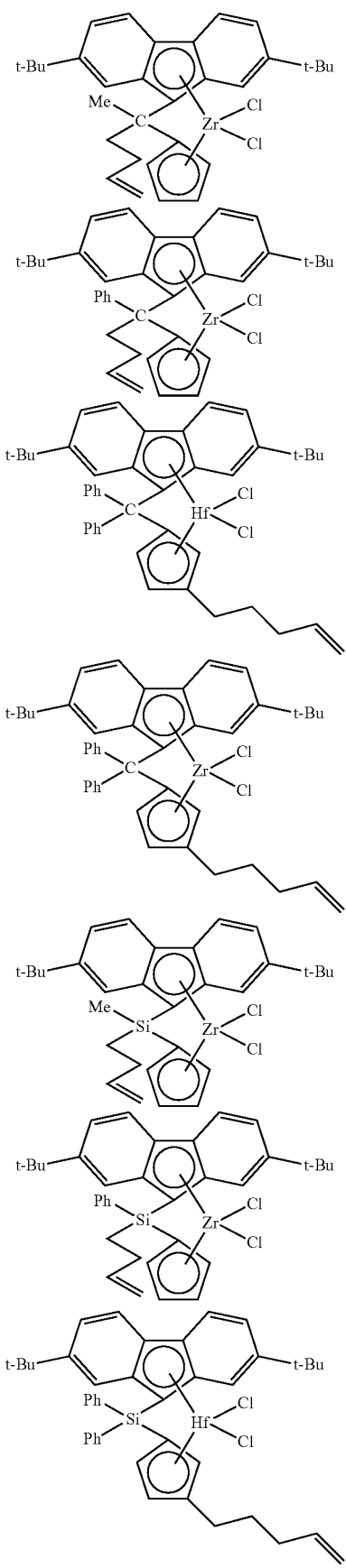

and the like, as well as combinations thereof.

While not being limited thereto, the second metallocene catalyst component can comprise a bridged metallocene (e.g., with titanium, zirconium, or hafnium) such as those described in U.S. Pat. Nos. 7,226,886 and 7,619,047, the disclosures of which are incorporated herein by reference in their entirety.

In another embodiment, the second metallocene catalyst component can produce the higher molecular weight component of the olefin polymer, and the second metallocene catalyst component can comprise zirconium and/or hafnium. Representative and non-limiting examples of metallocene compounds that can be employed as the second metallocene compound can include, but are not limited to, the following (Ph=phenyl, Me=methyl, and t-Bu=tert-butyl):

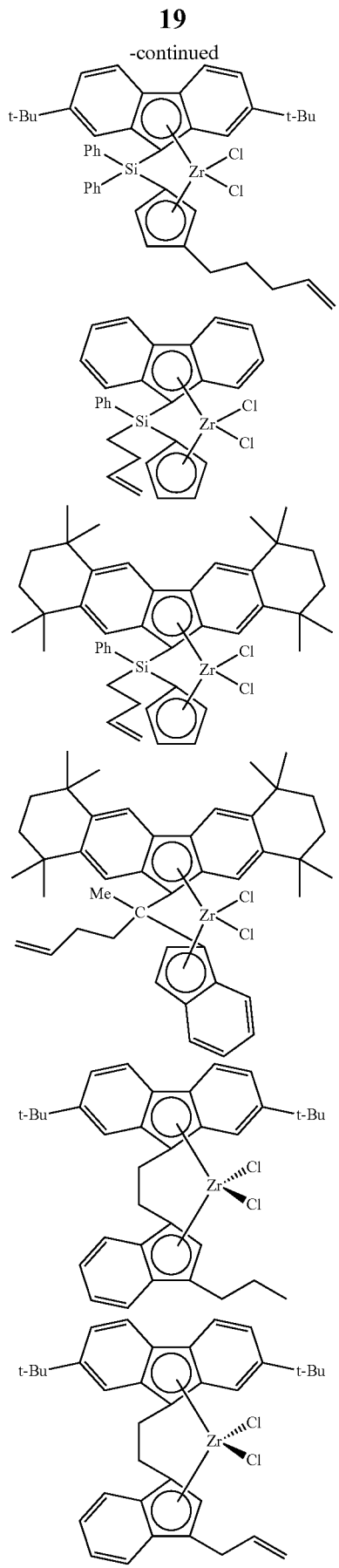

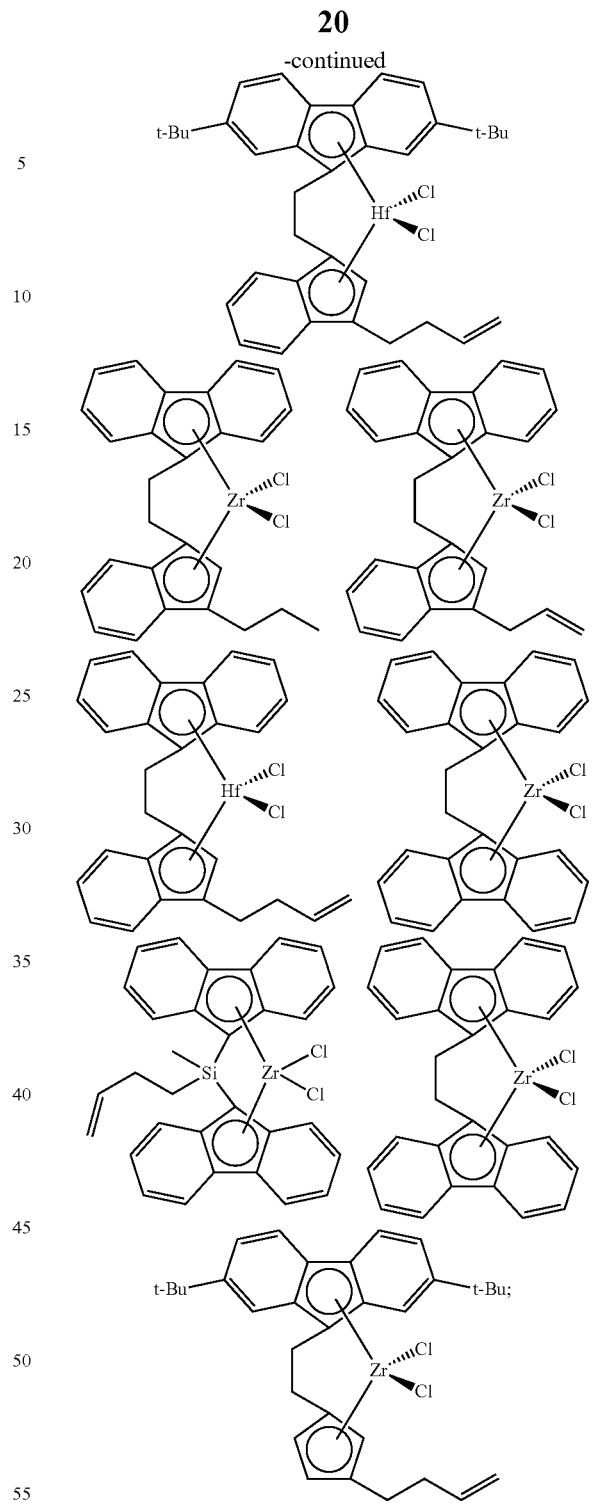

and the like, as well as combinations thereof.

In other embodiments, the dual catalyst system can comprise a first transition metal compound, a second transition metal compound, and an activator-support. In such embodiments, the methods and processes disclosed herein are not limited to any particular transition metal-based catalyst system; thus, any transition metal-based catalyst system (one or more than one) suitable for the polymerization of an olefin monomer (and optional olefin comonomer(s)) can be employed with an activator-support. The first transition metal compound and the second transition metal compound independently can comprise, for example, a transition metal (one or more than one) from Groups IIIB-VIIIB of the Periodic Table of the Elements. In one embodiment, the first transition metal compound and the second transition metal compound independently system can comprise a Group III, IV, V, or VI transition metal, or a combination of two or more transition metals. The first transition metal compound and the second transition metal compound independently can comprise chromium, titanium, zirconium, hafnium, vanadium, or a combination thereof, or can comprise chromium, titanium, zirconium, hafnium, or a combination thereof, in other embodiments. Accordingly, the first transition metal compound and the second transition metal compound independently can comprise chromium, or titanium, or zirconium, or hafnium, either singly or in combination. In an embodiment, the first transition metal compound can produce the lower molecular weight component of the olefin polymer, and the second transition metal compound can produce the higher molecular weight component of the olefin polymer.

Various transition metal-based catalyst systems known to a skilled artisan are useful in the polymerization of olefins. These include, but are not limited to, Ziegler-Natta based catalyst systems (e.g., Ziegler-based catalyst systems), chromium-based catalyst systems, metallocene-based catalyst systems, Phillips catalyst systems, Ballard catalyst systems, coordination compound catalyst systems, post-metallocene catalyst systems, and the like, including combinations thereof. The methods and processes disclosed herein are not limited to the aforementioned catalyst systems, but Applicants nevertheless contemplate particular embodiments directed to the use of these catalyst systems in the dual catalyst system olefin polymerizations described herein. For instance, the dual catalyst system can comprise a Ziegler-Natta based catalyst system, a chromium-based catalyst system, and/or a metallocene-based catalyst system; alternatively, a Ziegler-Natta based catalyst system; alternatively, a chromium-based catalyst system; or alternatively, a metallocene-based catalyst system. Examples of representative and non-limiting transition metal-based catalyst systems include those disclosed in the U.S. Pat. Nos. 3,887,494, 3,119,569, 4,053,436, 4,981,831, 4,364,842, 4,444,965, 4,364,855, 4,504,638, 4,364,854, 4,444,964, 4,444,962, 3,976,632, 4,248,735, 4,297,460, 4,397,766, 2,825,721, 3,225,023, 3,226,205, 3,622,521, 3,625,864, 3,900,457, 4,301,034, 4,547,557, 4,339,559, 4,806,513, 5,037,911, 5,219,817, 5,221,654, 4,081,407, 4,296,001, 4,392,990, 4,405,501, 4,151,122, 4,247,421, 4,460,756, 4,182,815, 4,735,931, 4,820,785, 4,988,657, 5,436,305, 5,610,247, 5,627,247, 3,242,099, 4,808,561, 5,275,992, 5,237,025, 5,244,990, 5,179,178, 4,855,271, 5,179,178, 5,275,992, 3,900,457, 4,939,217, 5,210,352, 5,436,305, 5,401,817, 5,631,335, 5,571,880, 5,191,132, 5,480,848, 5,399,636, 5,565,592, 5,347,026, 5,594,078, 5,498,581, 5,496,781, 5,563,284, 5,554,795, 5,420,320, 5,451,649, 5,541,272, 5,705,478, 5,631,203, 5,654,454, 5,705,579, 5,668,230, 6,300,271, 6,831,141, 6,653,416, 6,613,712, 7,294,599, 6,355,594, 6,395,666, 6,833,338, 7,417,097, 6,548,442, and 7,312,283, each of which is incorporated herein by reference in its entirety.

In some embodiments, the dual catalyst system can comprise an activator. For example, the dual catalyst system can comprise an activator-support, an aluminoxane compound, an organoboron or organoborate compound, an ionizing ionic compound, and the like, or any combination thereof. The catalyst system can contain one or more than one activator.

In one embodiment, the dual catalyst system can comprise an aluminoxane compound, an organoboron or organoborate compound, an ionizing ionic compound, and the like, or a combination thereof. Examples of such activators are disclosed in, for instance, U.S. Pat. Nos. 3,242,099, 4,794,096, 4,808,561, 5,576,259, 5,807,938, 5,919,983, and 8,114,946, the disclosures of which are incorporated herein by reference in their entirety. In another embodiment, the dual catalyst system can comprise an aluminoxane compound. In yet another embodiment, the dual catalyst system can comprise an organoboron or organoborate compound. In still another embodiment, the dual catalyst system can comprise an ionizing ionic compound.

In other embodiments, the dual catalyst system can comprise an activator-support, for example, an activator-support comprising a solid oxide treated with an electron-withdrawing anion. Examples of such materials are disclosed in, for instance, U.S. Pat. Nos. 7,294,599 and 7,601,665, the disclosures of which are incorporated herein by reference in their entirety.

The solid oxide used to produce the activator-support can comprise oxygen and one or more elements from Groups 2, 3, 4, 5, 6, 7, 8, 9, 10, 11, 12, 13, 14, or 15 of the periodic table, or comprising oxygen and one or more elements from the lanthanide or actinide elements (see e.g., Hawley's Condensed Chemical Dictionary, 11$^{th}$ Ed., John Wiley & Sons, 1995; Cotton, F. A., Wilkinson, G., Murillo, C. A., and Bochmann, M., Advanced Inorganic Chemistry, 6$^{th}$ Ed., Wiley-Interscience, 1999). For instance, the solid oxide can comprise oxygen and at least one element selected from Al, B, Be, Bi, Cd, Co, Cr, Cu, Fe, Ga, La, Mn, Mo, Ni, Sb, Si, Sn, Sr, Th, Ti, V, W, P, Y, Zn, and Zr.

Accordingly, suitable examples of solid oxide materials that can be used to form the activator-supports can include, but are not limited to, $Al_2O_3$, $B_2O_3$, $BeO$, $Bi_2O_3$, $CdO$, $Co_3O_4$, $Cr_2O_3$, $CuO$, $Fe_2O_3$, $Ga_2O_3$, $La_2O_3$, $Mn_2O_3$, $MoO_3$, $NiO$, $P_2O_5$, $Sb_2O_5$, $SiO_2$, $SnO_2$, $SrO$, $ThO_2$, $TiO_2$, $V_2O_5$, $WO_3$, $Y_2O_3$, $ZnO$, $ZrO_2$, and the like, including mixed oxides thereof, and combinations thereof. This includes co-gels or co-precipitates of different solid oxide materials. The solid oxide can encompass oxide materials such as alumina, "mixed oxides" thereof such as silica-alumina, and combinations and mixtures thereof. The mixed oxides such as silica-alumina can be single or multiple chemical phases with more than one metal combined with oxygen to form the solid oxide. Examples of mixed oxides that can be used to form an activator-support, either singly or in combination, can include, but are not limited to, silica-alumina, silica-titania, silica-zirconia, alumina-titania, alumina-zirconia, zinc-aluminate, alumina-boria, silica-boria, aluminophosphate-silica, titania-zirconia, and the like. The solid oxide used herein also can encompass oxide materials such as silica-coated alumina, as described in U.S. Pat. No. 7,884,163, the disclosure of which is incorporated herein by reference in its entirety.

Accordingly, in one embodiment, the solid oxide can comprise silica, alumina, silica-alumina, silica-coated alumina, aluminum phosphate, aluminophosphate, heteropolytungstate, titania, zirconia, magnesia, boria, zinc oxide, any mixed oxide thereof, or any combination thereof. In another embodiment, the solid oxide can comprise silica, alumina, titania, zirconia, magnesia, boria, zinc oxide, any mixed oxide thereof, or any combination thereof. In yet another embodiment, the solid oxide can comprise silica-alumina, silica-coated alumina, silica-titania, silica-zirconia, alumina-boria, or any combination thereof. In still another embodiment, the solid oxide can comprise silica; alternatively, alumina; alternatively, silica-alumina; or alternatively, silica-coated alumina.

The silica-alumina which can be used typically can have an alumina content from about 5 to about 95% by weight. In one embodiment, the alumina content of the silica-alumina can be from about 5 to about 50%, or from about 8% to about 30%, alumina by weight. In another embodiment, high alumina content silica-alumina compounds can be employed, in which the alumina content of these silica-alumina compounds typically can range from about 60% to about 90%, or from about 65% to about 80%, alumina by weight. According to yet another embodiment, the solid oxide component can comprise alumina without silica, and according to another embodiment, the solid oxide component can comprise silica without alumina. Moreover, as provided hereinabove, the solid oxide can comprise a silica-coated alumina. The solid oxide can have any suitable surface area, pore volume, and particle size, as would be recognized by those of skill in the art.

The electron-withdrawing component used to treat the solid oxide can be any component that increases the Lewis or Brønsted acidity of the solid oxide upon treatment (as compared to the solid oxide that is not treated with at least one electron-withdrawing anion). According to one embodiment, the electron-withdrawing component can be an electron-withdrawing anion derived from a salt, an acid, or other compound, such as a volatile organic compound, that serves as a source or precursor for that anion. Examples of electron-withdrawing anions can include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, and the like, including mixtures and combinations thereof. In addition, other ionic or non-ionic compounds that serve as sources for these electron-withdrawing anions also can be employed. It is contemplated that the electron-withdrawing anion can be, or can comprise, fluoride, chloride, bromide, phosphate, triflate, bisulfate, or sulfate, and the like, or any combination thereof, in some embodiments provided herein. In other embodiments, the electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, and the like, or combinations thereof.

In an embodiment, the dual catalyst system can comprise an activator-support, and the activator-support can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, as well as any mixture or combination thereof. In another embodiment, the dual catalyst system can comprise an activator-support, and the activator-support can comprise fluorided alumina, sulfated alumina, fluorided silica-alumina, sulfated silica-alumina, fluorided silica-zirconia, fluorided silica-coated alumina, sulfated silica-coated alumina, and the like, as well as any mixture or combination thereof.

Commonly used polymerization co-catalysts can include, but are not limited to, metal alkyl, or organometal, co-catalysts, with the metal encompassing boron, aluminum, and the like. The dual catalyst systems provided herein can comprise a co-catalyst, or a combination of co-catalysts. For instance, alkyl boron and/or alkyl aluminum compounds often can be used as co-catalysts in such catalyst systems. Representative boron compounds can include, but are not limited to, tri-n-butyl borane, tripropylborane, triethylborane, and the like, and this include combinations of two or more of these materials. While not being limited thereto, representative aluminum compounds (e.g., organoaluminum compounds) can include, trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, as well as any combination thereof.

Olefin Monomers and Olefin Polymers

Olefin monomers contemplated herein typically include olefin compounds having from 2 to 30 carbon atoms per molecule and having at least one olefinic double bond. Homopolymerization processes using a single olefin, such as ethylene, propylene, butene, hexene, octene, and the like, are encompassed, as well as copolymerization, terpolymerization, etc., reactions using an olefin monomer with at least one different olefinic compound. As previously disclosed, polymerization processes are meant to encompass oligomerization processes as well.

As an example, any resultant ethylene copolymers, terpolymers, etc., generally can contain a major amount of ethylene (>50 mole percent) and a minor amount of comonomer (<50 mole percent). Comonomers that can be copolymerized with ethylene often have from 3 to 20 carbon atoms, or from 3 to 10 carbon atoms, in their molecular chain.

Acyclic, cyclic, polycyclic, terminal (α), internal, linear, branched, substituted, unsubstituted, functionalized, and non-functionalized olefins can be employed. For example, typical unsaturated compounds that can be polymerized to produce olefin polymers can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described herein. Styrene also can be employed as a monomer or as a comonomer. In an embodiment, the olefin monomer can be a $C_2$-$C_{20}$ olefin; alternatively, a $C_2$-$C_{20}$ α-olefin; alternatively, a $C_2$-$C_{12}$ olefin; alternatively, a $C_2$-$C_{10}$ α-olefin; alternatively, ethylene, propylene, 1-butene, 1-hexene, or 1-octene; alternatively, ethylene or propylene; alternatively, ethylene; or alternatively, propylene.

When a copolymer (or alternatively, a terpolymer) is desired, the olefin monomer can be, for example, ethylene or propylene, which is copolymerized with at least one comonomer (e.g., a $C_2$-$C_{20}$ α-olefin, a $C_3$-$C_{20}$ α-olefin, etc.). According to one embodiment, the olefin monomer in the polymerization process can be ethylene. In this embodiment, examples of suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to one embodiment, the comonomer can comprise an α-olefin (e.g., a $C_3$-$C_{10}$ α-olefin), while in another embodiment, the comonomer can comprise 1-butene, 1-pentene, 1-hexene, 1-octene, 1-decene, styrene, or any combination thereof. For example, the comonomer can comprise 1-butene, 1-hexene, 1-octene, or a combination thereof.

Generally, the amount of comonomer introduced into a polymerization reactor to produce the copolymer can be from about 0.01 to about 50 weight percent of the comonomer based on the total weight of the monomer and comonomer. According to another embodiment, the amount of comonomer introduced into a polymerization reactor can be from about 0.01 to about 40 weight percent comonomer based on the total weight of the monomer and comonomer. In still another embodiment, the amount of comonomer introduced into a polymerization reactor can be from about 0.1 to about 35 weight percent comonomer based on the total weight of the monomer and comonomer. Yet, in another embodiment, the amount of comonomer introduced into a polymerization reactor can be from about 0.5 to about 20 weight percent comonomer based on the total weight of the monomer and comonomer.

While not intending to be bound by this theory, where branched, substituted, or functionalized olefins are used as reactants, it is believed that a steric hindrance can impede and/or slow the polymerization reaction. Thus, branched and/or cyclic portion(s) of the olefin removed somewhat from the carbon-carbon double bond would not be expected to hinder the reaction in the way that the same olefin substituents situated more proximate to the carbon-carbon double bond might.

According to one embodiment, at least one monomer/reactant can be ethylene, so the polymerization reaction can be a homopolymerization involving only ethylene, or a copolymerization with a different acyclic, cyclic, terminal, internal, linear, branched, substituted, or unsubstituted olefin. In addition, the methods disclosed herein intend for olefin to also encompass diolefin compounds that include, but are not limited to, 1,3-butadiene, isoprene, 1,4-pentadiene, 1,5-hexadiene, and the like.

Olefin polymers encompassed herein can include any polymer (or oligomer) produced from any olefin monomer (and optional comonomer(s)) described herein. For example, the olefin polymer can comprise an ethylene homopolymer, a propylene homopolymer, an ethylene copolymer (e.g., ethylene/α-olefin, ethylene/1-butene, ethylene/1-hexene, ethylene/1-octene, etc.), a propylene copolymer, an ethylene terpolymer, a propylene terpolymer, and the like, including combinations thereof. Moreover, additional polymer components can be present in the olefin polymer, in addition to the higher molecular weight component and the lower molecular weight component. Accordingly, in one embodiment, the olefin polymer can have a bimodal molecular weight distribution, while in another embodiment, the olefin polymer can have a multimodal molecular weight distribution.

Polymerization Reactor Systems

The disclosed methods are intended for any olefin polymerization process using various types of polymerization reactors, polymerization reactor systems, and polymerization reaction conditions. As used herein, "polymerization reactor" includes any polymerization reactor capable of polymerizing (inclusive of oligomerizing) olefin monomers and comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Polymerization reactor systems and processes also can include partial or full direct recycle of unreacted monomer, unreacted comonomer, and/or diluent.

A polymerization reactor system can comprise a single reactor or multiple reactors (2 reactors, more than 2 reactors, etc.) of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both.

According to one embodiment, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, and 6,833,415, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another embodiment, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference in its entirety herein.

According to still another embodiment, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another embodiment, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, load-out, laboratory analysis, and process control. Depending upon the desired properties of the olefin polymer, hydrogen can be added to the polymerization reactor as needed (e.g., continuously, pulsed, etc.), and as discussed hereinabove.

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. A suitable polymerization temperature can be any temperature below the de-polymerization temperature according to the Gibbs Free energy equation. Typically, this includes from about 60° C. to about 280° C., for example, or from about 60° C. to about 110° C., depending upon the type of polymerization reactor. In some reactor systems, the polymerization temperature generally can be within a range from about 70° C. to about 90° C., or from about 75° C. to about 85° C.

Suitable pressures will also vary according to the reactor and polymerization type. The pressure for liquid phase polymerizations in a loop reactor typically can be less than 1000 psig. The pressure for gas phase polymerization can be in the 200 to 500 psig range. High pressure polymerization in tubular or autoclave reactors generally can be conducted at about 20,000 to 75,000 psig. Polymerization reactors also can be operated in a supercritical region occurring at generally higher temperatures and pressures. Operation above the critical point of a pressure/temperature diagram (supercritical phase) can offer advantages.

EXAMPLES

Embodiments of the invention are further illustrated by the following examples, which are not to be construed in any way as imposing limitations to the scope of this invention described herein. Various other aspects, embodiments, modifications, and equivalents thereof which, after reading the description herein, can suggest themselves to one of ordinary skill in the art without departing from the spirit of the present invention or the scope of the appended claims.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, Mass.) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. The integral calibration method was used to deduce molecular weights and molecular weight distributions using a Chevron Phillips Chemicals Company's HDPE polyethylene resin, MARLEX BHB5003, as the broad standard. The integral table of the broad standard was pre-determined in a separate experiment with SEC-MALS.

Examples 1-5

Impact of the Polymerization Reaction Temperature on the Molecular Weight Distribution and on the Ratio of the Higher Molecular Weight Component to the Lower Molecular Weight Component of the Polymer The polymerization experiments of Examples 1-5 were conducted in a one-gallon (3.8-L) stainless steel reactor with 2 L of isobutane. No hydrogen and comonomer were used in these examples. Metallocene solutions (nominal 1 mg/mL) of MET-A and MET-B were prepared by dissolving 15 mg of the respective metallocene in 15 mL of toluene. Metallocenes MET-A and MET-B had the following structures:

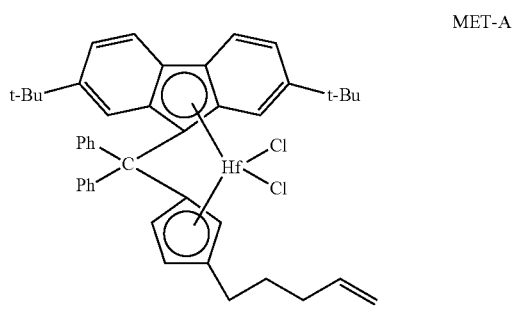

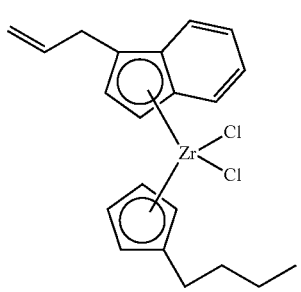

MET-B

Approximately 1.5 mg of MET-A and 1.5 mg of MET-B (a 1:1 weight ratio) were used in Examples 1-5, and the MET-A and MET-B metallocene solutions were premixed before they were charged into the reactor.

The polymerization experiments were performed as follows. First, 1 mmol of triisobutylaluminum (TIBA), 300 mg of sulfated alumina, and the premixed metallocene solution containing MET-A and MET-B were added in that order through a charge port while slowly venting isobutane vapor. The charge port was closed and 2 L of isobutane were added. The contents of the reactor were stirred and heated to the desired polymerization reaction temperature, and this temperature was maintained for the 45 min duration of the polymerization experiment using an automated temperature control system. Ethylene was fed on demand to maintain 14 mol % ethylene (based on isobutane). After the polymerization experiment was complete, the reactor was cooled and vented, and the polymer produced was removed from the reactor and dried.

Table I summarizes the reaction temperature, amount of polymer produced, and the weight ratio of the higher molecular weight component to the lower molecular weight component of the polymer, for Examples 1-5. The ratio of the higher molecular weight component to the lower molecular weight component of the polymer is illustrated graphically in FIG. 1 for the polymers of Examples 1-5. The weight ratios listed in Table I were obtained by fitting the respective molecular weight distribution curves with a Gaussian distribution. FIG. 1 demonstrates the impact of polymerization reaction temperature on the molecular weight distribution (amount of polymer versus the log of molecular weight). As shown in FIG. 1, and unexpectedly, as the reaction temperature increased from 85° C. to 100° C., the weight ratio of the higher molecular weight component to the lower molecular weight component increased (e.g., relatively more high molecular weight material was produced). Moreover, the impact of temperature appeared to change the relative heights of the lower molecular weight and the higher molecular peaks, as shown in FIG. 1, but did not appear to significantly shift the whole molecular weight distribution to a higher (to the right) or lower (to the left) molecular weight.

TABLE I

Examples 1-5.

| Example | Reaction Temperature (° C.) | Weight Ratio | PE Produced (g) |
|---|---|---|---|
| 1 | 85 | 0.14 | 260 |
| 2 | 90 | 0.21 | 295 |
| 3 | 95 | 0.33 | 282 |

TABLE I-continued

Examples 1-5.

| Example | Reaction Temperature (° C.) | Weight Ratio | PE Produced (g) |
|---|---|---|---|
| 4 | 98 | 0.37 | 255 |
| 5 | 100 | 0.48 | 217 |

Examples 6-8

Impact of the Catalyst System Reaction Time on the Molecular Weight Distribution and on the Ratio of the Higher Molecular Weight Component to the Lower Molecular Weight Component of the Polymer The polymerization experiments of Examples 6-8 were conducted in substantially the same manner as that of Examples 1-5, with the following differences. In Examples 6-8, approximately 2 mg each of MET-A and MET-B (a 1:1 weight ratio), 0.8 mmol of TIBA, and 200 mg of sulfated alumina were used. The polymerization reaction temperature was 92° C., and the ethylene concentration was 14 mol % (based on isobutane).

Figure 2:
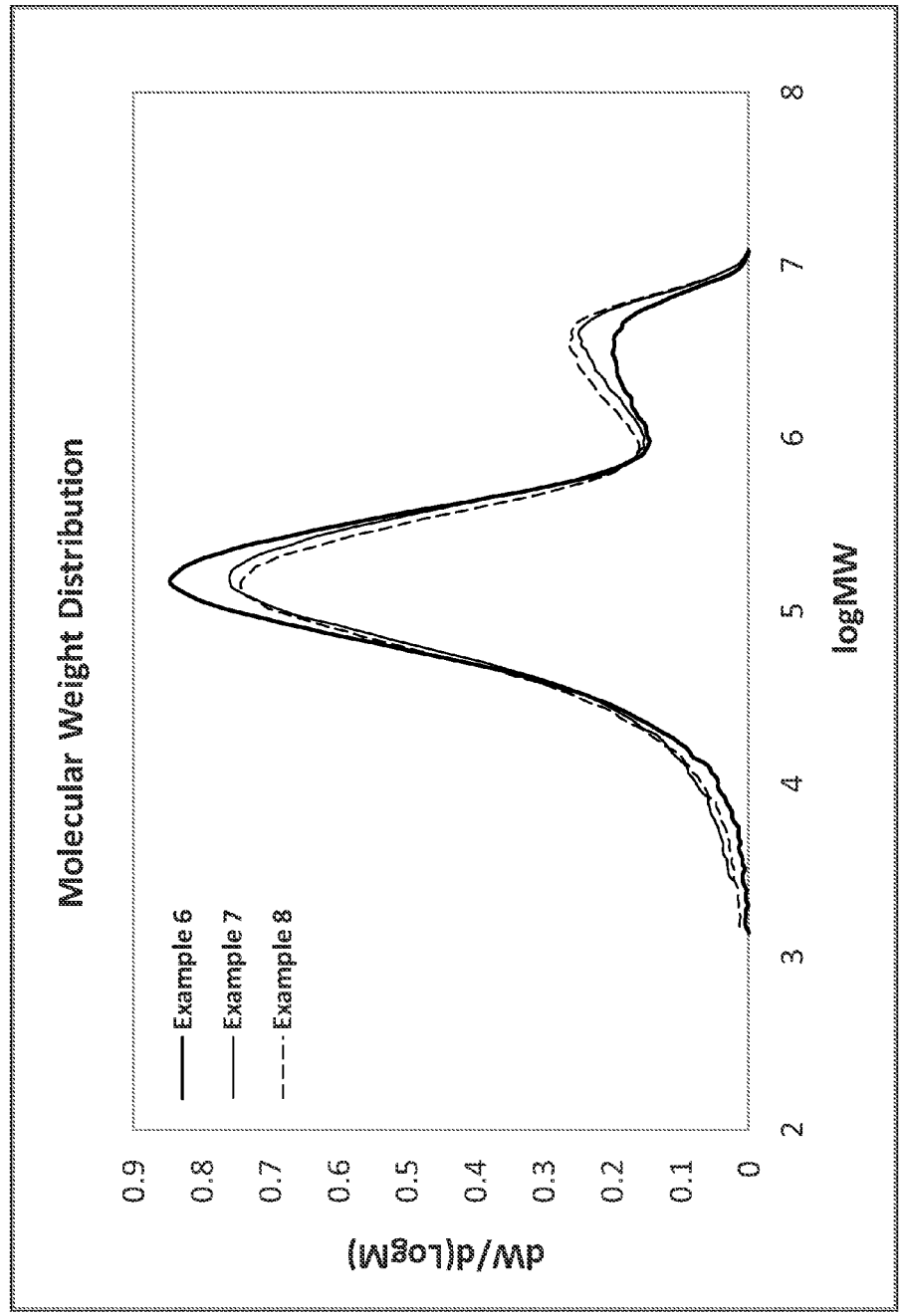
FIG. 2 presents a plot of the molecular weight distribution as a function of the catalyst system reaction time for Examples 6-8.

The reaction times for Examples 6-8 ranged from 25 min to 60 min, as shown in Table II, which also lists the amount of polymer produced and the weight ratio of the higher molecular weight component to the lower molecular weight component of the polymer, for Examples 6-8. The ratio of the higher molecular weight component to the lower molecular weight component of the polymer is illustrated graphically in FIG. 2 for the polymers of Examples 6-8. The weight ratios listed in Table II were obtained by fitting the respective molecular weight distribution curves with a Gaussian distribution. FIG. 2 demonstrates the impact of reaction time on the molecular weight distribution (amount of polymer versus the log of molecular weight). As shown in FIG. 2, and unexpectedly, as the reaction time increased from 25 min to 60 min, the weight ratio of the higher molecular weight component to the lower molecular weight component increased (e.g., relatively more high molecular weight material was produced). Moreover, the impact of reaction time appeared to change the relative heights of the lower molecular weight and the higher molecular peaks, as shown in FIG. 2, but did not appear to shift the whole molecular weight distribution to a higher (to the right) or lower (to the left) molecular weight.

TABLE II

Examples 6-8.

| Example | Reaction Time (min) | Weight Ratio | PE Produced (g) |
|---|---|---|---|
| 6 | 25 | 0.18 | 166 |
| 7 | 45 | 0.21 | 297 |
| 8 | 60 | 0.25 | 395 |

The invention has been described above with reference to numerous embodiments and specific examples. Many variations will suggest themselves to those skilled in the art in light of the above detailed description. All such obvious variations are within the full intended scope of the appended claims. Other embodiments of the invention can include, but are not limited to, the following:

Embodiment 1. A polymerization process, the process comprising:

(1) contacting a dual catalyst system with an olefin monomer and an optional olefin comonomer in a polymerization reactor system under polymerization conditions to produce an olefin polymer, wherein the olefin polymer comprises a higher molecular weight component and a lower molecular weight component, wherein the dual catalyst system comprises a first metallocene catalyst component and a second metallocene catalyst component, and wherein the polymerization conditions comprise a reaction temperature and a dual catalyst system residence time; and (2) controlling a weight ratio of the higher molecular weight component to the lower molecular weight component by adjusting the reaction temperature and/or the dual catalyst system residence time.

Embodiment 2. A method of controlling a weight ratio of a higher molecular weight component to a lower molecular weight component of an olefin polymer, the method comprising:

(i) contacting a dual catalyst system with an olefin monomer and an optional olefin comonomer in a polymerization reactor system under polymerization conditions to produce the olefin polymer, wherein the dual catalyst system comprises a first metallocene catalyst component and a second metallocene catalyst component, and wherein the polymerization conditions comprise a reaction temperature and a dual catalyst system residence time; and (ii) adjusting the reaction temperature and/or the dual catalyst system residence time to control the weight ratio of the higher molecular weight component to the lower molecular weight component.

Embodiment 3. A process for producing an olefin polymer with a target weight ratio of a higher molecular weight component to a lower molecular weight component, the process comprising:

(a) contacting a dual catalyst system with an olefin monomer and an optional olefin comonomer in a polymerization reactor system under polymerization conditions, wherein the dual catalyst system comprises a first metallocene catalyst component and a second metallocene catalyst component, and wherein the polymerization conditions comprise a reaction temperature and a dual catalyst system residence time; and (b) controlling the reaction temperature and/or the dual reactor catalyst system residence time to produce the olefin polymer with the target weight ratio of the higher molecular weight component to the lower molecular weight component.

Embodiment 4. The method or process defined in any one of embodiments 1-3, wherein the dual catalyst system comprises any activator disclosed herein.

Embodiment 5. The method or process defined in any one of embodiments 1-4, wherein the dual catalyst system comprises an activator-support, an aluminoxane compound, an organoboron or organoborate compound, an ionizing ionic compound, or any combination thereof.

Embodiment 6. The method or process defined in any one of embodiments 1-5, wherein the dual catalyst system comprises an aluminoxane compound, an organoboron or organoborate compound, an ionizing ionic compound, or any combination thereof.

Embodiment 7. The method or process defined in any one of embodiments 1-6, wherein the dual catalyst system comprises an aluminoxane compound.

Embodiment 8. The method or process defined in any one of embodiments 1-6, wherein the dual catalyst system comprises an organoboron or organoborate compound.

Embodiment 9. The method or process defined in any one of embodiments 1-6, wherein the dual catalyst system comprises an ionizing ionic compound.

Embodiment 10. The method or process defined in any one of embodiments 1-5, wherein the dual catalyst system comprises an activator-support comprising a solid oxide treated with an electron-withdrawing anion, for example, comprising any solid oxide and any electron-withdrawing anion disclosed herein.

Embodiment 11. The method or process defined in any one of embodiments 1-5, wherein the dual catalyst system comprises an activator-support comprising fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or any combination thereof.

Embodiment 12. The method or process defined in any one of embodiments 1-5, wherein the dual catalyst system comprises an activator-support comprising fluorided alumina, sulfated alumina, fluorided silica-alumina, sulfated silica-alumina, fluorided silica-zirconia, fluorided silica-coated alumina, sulfated silica-coated alumina, or any combination thereof.

Embodiment 13. The method or process defined in any one of the preceding embodiments, wherein the dual catalyst system comprises any co-catalyst disclosed herein, for example, a metal alkyl, an organoaluminum, etc.

Embodiment 14. The method or process defined in any one of the preceding embodiments, wherein the dual catalyst system comprises an organoaluminum compound comprising trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

Embodiment 15. The method or process defined in any one of the preceding embodiments, wherein the weight ratio of the higher molecular weight component to the lower molecular weight component increases as the reaction temperature increases.

Embodiment 16. The method or process defined in any one of the preceding embodiments, wherein the reaction temperature is in any range of reaction temperatures disclosed herein.

Embodiment 17. The method or process defined in any one of the preceding embodiments, wherein the reaction temperature is in a range from about 60° C. to about 110° C., or from about 80° C. to about 105° C.

Embodiment 18. The method or process defined in any one of the preceding embodiments, wherein the weight ratio of the higher molecular weight component to the lower molecular weight component increases as the dual catalyst system residence time (or reaction time) increases.

Embodiment 19. The method or process defined in any one of the preceding embodiments, wherein the dual catalyst system residence time is in any range of residence times disclosed herein.

Embodiment 20. The method or process defined in any one of the preceding embodiments, wherein the dual catalyst system residence time is in a range from about 10 min to about 2 hr, or from about 15 min to about 90 min.

Embodiment 21. The method or process defined in any one of the preceding embodiments, wherein the weight ratio of the higher molecular weight component to the lower molecular weight component is in any range of weight ratios disclosed herein.

Embodiment 22. The method or process defined in any one of the preceding embodiments, wherein the weight ratio of the higher molecular weight component to the lower molecular weight component is in a range of from about 1:100 to about 100:1, from about 1:10 to about 10:1, or from about 1:5 to about 5:1.

Embodiment 23. The method or process defined in any one of the preceding embodiments, wherein the reactor % solids is in any range of % solids disclosed herein.

Embodiment 24. The method or process defined in any one of the preceding embodiments, wherein the reactor % solids is in a range from about 30 to about 65 wt. %.

Embodiment 25. The method or process defined in any one of the preceding embodiments, wherein the reactor % solids is in a range from about 30 to about 55 wt. %.

Embodiment 26. The method or process defined in any one of the preceding embodiments, wherein the polymerization reactor system comprises a batch reactor, a slurry reactor, a gas-phase reactor, a solution reactor, a high pressure reactor, a tubular reactor, an autoclave reactor, or a combination thereof.

Embodiment 27. The method or process defined in any one of the preceding embodiments, wherein the polymerization reactor system comprises a slurry reactor, a gas-phase reactor, a solution reactor, or a combination thereof.

Embodiment 28. The method or process defined in any one of the preceding embodiments, wherein the polymerization reactor system comprises a slurry reactor.

Embodiment 29. The method or process defined in any one of embodiments 1-28, wherein the polymerization reactor system comprises a single reactor.

Embodiment 30. The method or process defined in any one of embodiments 1-28, wherein the polymerization reactor system comprises 2 reactors.

Embodiment 31. The method or process defined in any one of embodiments 1-28, wherein the polymerization reactor system comprises more than 2 reactors.

Embodiment 32. The method or process defined in any one of embodiments 1-31, wherein the olefin polymer has a multimodal molecular weight distribution.

Embodiment 33. The method or process defined in any one of embodiments 1-31, wherein the olefin polymer has a bimodal molecular weight distribution.

Embodiment 34. The method or process defined in any one of the preceding embodiments, wherein the olefin monomer comprises a $C_2$-$C_{20}$ olefin.

Embodiment 35. The method or process defined in any one of the preceding embodiments, wherein the olefin monomer and the optional olefin comonomer independently comprise a $C_2$-$C_{20}$ alpha-olefin.

Embodiment 36. The method or process defined in any one of the preceding embodiments, wherein the olefin monomer comprises ethylene.

Embodiment 37. The method or process defined in any one of the preceding embodiments, wherein the olefin monomer comprises ethylene and the olefin comonomer comprises a $C_3$-$C_{10}$ alpha-olefin.

Embodiment 38. The method or process defined in any one of the preceding embodiments, wherein the olefin monomer comprises ethylene and the olefin comonomer comprises 1-butene, 1-hexene, 1-octene, or a mixture thereof.

Embodiment 39. The method or process defined in any one of the preceding embodiments, wherein the olefin polymer comprises any olefin polymer disclosed herein.

Embodiment 40. The method or process defined in any one of the preceding embodiments, wherein the olefin polymer comprises an ethylene homopolymer, an ethylene/1-butene copolymer, an ethylene/1-hexene copolymer, an ethylene/1-octene copolymer, or a combination thereof.

Embodiment 41. The method or process defined in any one of the preceding embodiments, wherein the olefin polymer comprises an ethylene copolymer, and the density of the ethylene copolymer is controlled by adjusting a molar ratio of ethylene to the olefin comonomer, and adjusting the weight ratio of the higher molecular weight component to the lower molecular weight component.

Embodiment 42. The method or process defined in any one of the preceding embodiments, wherein the first metallocene catalyst component and the second metallocene catalyst component independently comprise chromium, vanadium, titanium, zirconium, hafnium, or a combination thereof.

Embodiment 43. The method or process defined in any one of the preceding embodiments, wherein the first metallocene catalyst component and the second metallocene catalyst component independently comprise titanium, zirconium, hafnium, or a combination thereof.

Embodiment 44. The method or process defined in any one of the preceding embodiments, wherein the weight ratio of the first metallocene catalyst component to the second metallocene catalyst component is in any range of weight ratios disclosed herein.

Embodiment 45. The method or process defined in any one of the preceding embodiments, wherein the weight ratio of the first metallocene catalyst component to the second metallocene catalyst component is in a range of from about 1:100 to about 100:1, from about 1:5 to about 5:1, or from about 1:2 to about 2:1.

Embodiment 46. The method or process defined in any one of the preceding embodiments, wherein the first metallocene catalyst component produces the lower molecular weight component.

Embodiment 47. The method or process defined in any one of the preceding embodiments, wherein the first metallocene catalyst component comprises any first metallocene catalyst component disclosed herein.

Embodiment 48. The method or process defined in any one of the preceding embodiments, wherein the first metallocene catalyst component comprises zirconium.

Embodiment 49. The method or process defined in any one of the preceding embodiments, wherein the second metallocene catalyst component produces the higher molecular weight component.

Embodiment 50. The method or process defined in any one of the preceding embodiments, wherein the second metallocene catalyst component comprises any second metallocene catalyst component disclosed herein.

Embodiment 51. The method or process defined in any one of the preceding embodiments, wherein the second metallocene catalyst component comprises zirconium and/or hafnium.

Embodiment 52. The method or process defined in any one of embodiments 1-51, wherein a weight ratio of the first metallocene catalyst component to the second metallocene catalyst component is substantially constant, for example, for a particular polymer grade.

Embodiment 53. The method or process defined in any one of embodiments 1-51, further comprising a step of adjusting the weight ratio of the first metallocene catalyst component to the second metallocene catalyst component.

Embodiment 54. The method or process defined in any one of embodiments 1-53, wherein no hydrogen is added to the polymerization reactor system.

Embodiment 55. The method or process defined in any one of embodiments 1-53, wherein hydrogen is added to the polymerization reactor system, and the hydrogen addition is substantially constant, for example, for a particular polymer grade.

Embodiment 56. The method or process defined in any one of embodiments 1-53, further comprising a step of adding hydrogen to the polymerization reactor system to adjust a molecular weight parameter (e.g., Mw, Mn, Mw/Mn, etc.) of the polymer.

Embodiment 57. The method or process defined in any one of embodiments 1-53, further comprising a step of adding hydrogen to the polymerization reactor system to adjust the weight-average molecular weight (Mw) and/or the melt index (MI) of the polymer.

Embodiment 58. The method or process defined in any one of embodiments 55-57, wherein the step of adding hydrogen decreases the Mw and/or increases the melt index of the polymer.

Embodiment 59. The method or process defined in any one of embodiments 55-58, wherein the step of adding hydrogen increases the weight ratio of the higher molecular weight component to the lower molecular weight component.

Embodiment 60. The method or process defined in any one of the preceding embodiments, further comprising the steps of determining (or measuring) the weight ratio of the higher molecular weight component to the lower molecular weight component, and adjusting the reaction temperature and/or the dual catalyst system residence time based on the difference between the measured weight ratio and the target weight ratio.

Embodiment 61. A polymerization process, the process comprising:

(1) contacting a dual catalyst system with an olefin monomer and an optional olefin comonomer in a polymerization reactor system under polymerization conditions to produce an olefin polymer, wherein the olefin polymer comprises a higher molecular weight component and a lower molecular weight component, wherein the dual catalyst system comprises a first transition metal compound, a second transition metal compound, and an activator-support, and wherein the polymerization conditions comprise a reaction temperature and a dual catalyst system residence time; and (2) controlling a weight ratio of the higher molecular weight component to the lower molecular weight component by adjusting the reaction temperature and/or the dual catalyst system residence time.

Embodiment 62. A method of controlling a weight ratio of a higher molecular weight component to a lower molecular weight component of an olefin polymer, the method comprising:

(i) contacting a dual catalyst system with an olefin monomer and an optional olefin comonomer in a polymerization reactor system under polymerization conditions to produce the olefin polymer, wherein the dual catalyst system comprises a first transition metal compound, a second transition metal compound, and an activator-support, and wherein the polymerization conditions comprise a reaction temperature and a dual catalyst system residence time; and (ii) adjusting the reaction temperature and/or the dual catalyst system residence time to control the weight ratio of the higher molecular weight component to the lower molecular weight component.

Embodiment 63. A process for producing an olefin polymer with a target weight ratio of a higher molecular weight component to a lower molecular weight component, the process comprising:

(a) contacting a dual catalyst system with an olefin monomer and an optional olefin comonomer in a polymerization reactor system under polymerization conditions, wherein the dual catalyst system comprises a first transition metal compound, a second transition metal compound, and an activator-support, and wherein the polymerization conditions comprise a reaction temperature and a dual catalyst system residence time; and (b) controlling the reaction temperature and/or the dual reactor catalyst system residence time to produce the olefin polymer with the target weight ratio of the higher molecular weight component to the lower molecular weight component.

Embodiment 64. The method or process defined in any one of embodiments 61-63, wherein the dual catalyst system comprises any activator-support disclosed herein.

Embodiment 65. The method or process defined in any one of embodiments 61-64, wherein the dual catalyst system comprises an activator-support comprising a solid oxide treated with an electron-withdrawing anion, for example, comprising any solid oxide and any electron-withdrawing anion disclosed herein.

Embodiment 66. The method or process defined in any one of embodiments 61-65, wherein the dual catalyst system comprises an activator-support comprising fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or any combination thereof.

Embodiment 67. The method or process defined in any one of embodiments 61-65, wherein the dual catalyst system comprises an activator-support comprising fluorided alumina, sulfated alumina, fluorided silica-alumina, sulfated silica-alumina, fluorided silica-zirconia, fluorided silica-coated alumina, sulfated silica-coated alumina, or any combination thereof Embodiment 68. The method or process defined in any one of embodiments 61-67, wherein the dual catalyst system comprises any co-catalyst disclosed herein, for example, a metal alkyl, an organoaluminum, etc.

Embodiment 69. The method or process defined in any one of embodiments 61-68, wherein the dual catalyst system comprises an organoaluminum compound comprising trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

Embodiment 70. The method or process defined in any one of embodiments 61-69, wherein the weight ratio of the higher molecular weight component to the lower molecular weight component increases as the reaction temperature increases.

Embodiment 71. The method or process defined in any one of embodiments 61-70, wherein the reaction temperature is in any range of reaction temperatures disclosed herein.

Embodiment 72. The method or process defined in any one of embodiments 61-71, wherein the reaction temperature is in a range from about 60° C. to about 110° C., or from about 80° C. to about 105° C.

Embodiment 73. The method or process defined in any one of embodiments 61-72, wherein the weight ratio of the higher molecular weight component to the lower molecular weight component increases as the dual catalyst system residence time (or reaction time) increases.

Embodiment 74. The method or process defined in any one of embodiments 61-73, wherein the dual catalyst system residence time is in any range of residence times disclosed herein.

Embodiment 75. The method or process defined in any one of embodiments 61-74, wherein the dual catalyst system residence time is in a range from about 10 min to about 2 hr, or from about 15 min to about 90 min.

Embodiment 76. The method or process defined in any one of embodiments 61-75, wherein the weight ratio of the higher molecular weight component to the lower molecular weight component is in any range of weight ratios disclosed herein.

Embodiment 77. The method or process defined in any one of embodiments 61-76, wherein the weight ratio of the higher molecular weight component to the lower molecular weight component is in a range of from about 1:100 to about 100:1, from about 1:10 to about 10:1, or from about 1:5 to about 5:1.

Embodiment 78. The method or process defined in any one of embodiments 61-77, wherein the reactor % solids is in any range of % solids disclosed herein.

Embodiment 79. The method or process defined in any one of embodiments 61-78, wherein the reactor % solids is in a range from about 30 to about 65 wt. %.

Embodiment 80. The method or process defined in any one of embodiments 61-79, wherein the reactor % solids is in a range from about 30 to about 55 wt. %.

Embodiment 81. The method or process defined in any one of embodiments 61-80, wherein the polymerization reactor system comprises a batch reactor, a slurry reactor, a gas-phase reactor, a solution reactor, a high pressure reactor, a tubular reactor, an autoclave reactor, or a combination thereof.

Embodiment 82. The method or process defined in any one of embodiments 61-81, wherein the polymerization reactor system comprises a slurry reactor, a gas-phase reactor, a solution reactor, or a combination thereof.

Embodiment 83. The method or process defined in any one of embodiments 61-82, wherein the polymerization reactor system comprises a slurry reactor.

Embodiment 84. The method or process defined in any one of embodiments 61-83, wherein the polymerization reactor system comprises a single reactor.

Embodiment 85. The method or process defined in any one of embodiments 61-83, wherein the polymerization reactor system comprises 2 reactors.

Embodiment 86. The method or process defined in any one of embodiments 61-83, wherein the polymerization reactor system comprises more than 2 reactors.

Embodiment 87. The method or process defined in any one of embodiments 61-86, wherein the olefin polymer has a multimodal molecular weight distribution.

Embodiment 88. The method or process defined in any one of embodiments 61-86, wherein the olefin polymer has a bimodal molecular weight distribution.

Embodiment 89. The method or process defined in any one of embodiments 61-88, wherein the olefin monomer comprises a $C_2$-$C_{20}$ olefin.

Embodiment 90. The method or process defined in any one of embodiments 61-89, wherein the olefin monomer and the optional olefin comonomer independently comprise a $C_2$-$C_{20}$ alpha-olefin.

Embodiment 91. The method or process defined in any one of embodiments 61-90, wherein the olefin monomer comprises ethylene.

Embodiment 92. The method or process defined in any one of embodiments 61-91, wherein the olefin monomer comprises ethylene and the olefin comonomer comprises a $C_3$-$C_{10}$ alpha-olefin.

Embodiment 93. The method or process defined in any one of embodiments 61-92, wherein the olefin monomer comprises ethylene and the olefin comonomer comprises 1-butene, 1-hexene, 1-octene, or a mixture thereof.

Embodiment 94. The method or process defined in any one of embodiments 61-93, wherein the olefin polymer comprises any olefin polymer disclosed herein.

Embodiment 95. The method or process defined in any one of embodiments 61-94, wherein the olefin polymer comprises an ethylene homopolymer, an ethylene/1-butene copolymer, an ethylene/1-hexene copolymer, an ethylene/1-octene copolymer, or a combination thereof.

Embodiment 96. The method or process defined in any one of embodiments 61-95, wherein the olefin polymer comprises an ethylene copolymer, and the density of the ethylene copolymer is controlled by adjusting a molar ratio of ethylene to the olefin comonomer, and adjusting the weight ratio of the higher molecular weight component to the lower molecular weight component.

Embodiment 97. The method or process defined in any one of embodiments 61-96, wherein the first transition metal compound and the second transition metal compound independently comprise any transition metal disclosed herein, for example, chromium, vanadium, titanium, zirconium, hafnium, or a combination thereof.

Embodiment 98. The method or process defined in any one of embodiments 61-97, wherein the first transition metal compound and the second transition metal compound independently comprise chromium, titanium, zirconium, hafnium, or a combination thereof.

Embodiment 99. The method or process defined in any one of embodiments 61-98, wherein the dual catalyst system comprises any transition metal-based catalyst system disclosed herein, for example, a Ziegler-Natta based catalyst system, a chromium-based catalyst system, a metallocene-based catalyst systems, a Phillips catalyst systems, a Ballard catalyst system, a coordination compound catalyst system, a post-metallocene catalyst system, or combinations thereof.

Embodiment 100. The method or process defined in any one of embodiments 61-99, wherein the dual catalyst system comprises a Ziegler-Natta based catalyst system, a chromium-based catalyst system, and/or a metallocene-based catalyst system.

Embodiment 101. The method or process defined in any one of embodiments 61-100, wherein the dual catalyst system comprises a Ziegler-Natta based catalyst system.

Embodiment 102. The method or process defined in any one of embodiments 61-100, wherein the dual catalyst system comprises a chromium-based catalyst system.

Embodiment 103. The method or process defined in any one of embodiments 61-100, wherein the dual catalyst system comprises a metallocene-based catalyst system.

Embodiment 104. The method or process defined in any one of embodiments 61-103, wherein the weight ratio of the first transition metal compound to the second transition metal compound is in any range of weight ratios disclosed herein.

Embodiment 105. The method or process defined in any one of embodiments 61-104, wherein the weight ratio of the first transition metal compound to the second transition metal compound is in a range of from about 1:100 to about 100:1, from about 1:5 to about 5:1, or from about 1:2 to about 2:1.

Embodiment 106. The method or process defined in any one of embodiments 61-105, wherein the first transition metal compound produces the lower molecular weight component.

Embodiment 107. The method or process defined in any one of embodiments 61-106, wherein the second transition metal compound produces the higher molecular weight component.

Embodiment 108. The method or process defined in any one of embodiments 61-107, wherein a weight ratio of the first transition metal compound to the second transition metal compound is substantially constant, for example, for a particular polymer grade.

Embodiment 109. The method or process defined in any one of embodiments 61-107, further comprising a step of adjusting the weight ratio of the first transition metal compound to second transition metal compound.

Embodiment 110. The method or process defined in any one of embodiments 61-109, wherein no hydrogen is added to the polymerization reactor system.

Embodiment 111. The method or process defined in any one of embodiments 61-109, wherein hydrogen is added to the polymerization reactor system, and the hydrogen addition is substantially constant, for example, for a particular polymer grade.

Embodiment 112. The method or process defined in any one of embodiments 61-109, further comprising a step of adding hydrogen to the polymerization reactor system to adjust a molecular weight parameter (e.g., Mw, Mn, Mw/Mn, etc.) of the polymer.

Embodiment 113. The method or process defined in any one of embodiments 61-109, further comprising a step of adding hydrogen to the polymerization reactor system to adjust the weight-average molecular weight (Mw) and/or the melt index (MI) of the polymer.

Embodiment 114. The method or process defined in any one of embodiments 111-113, wherein the step of adding hydrogen decreases the Mw and/or increases the melt index of the polymer.

Embodiment 115. The method or process defined in any one of embodiments 111-114, wherein the step of adding hydrogen increases the weight ratio of the higher molecular weight component to the lower molecular weight component.

Embodiment 116. The method or process defined in any one of embodiments 61-115, further comprising the steps of determining (or measuring) the weight ratio of the higher molecular weight component to the lower molecular weight component, and adjusting the reaction temperature and/or the dual catalyst system residence time based on the difference between the measured weight ratio and the target weight ratio.

We claim:

1. A polymerization process, the process comprising:
    (1) contacting a dual catalyst system with an olefin monomer and an olefin comonomer in a polymerization reactor system under polymerization conditions to produce an olefin polymer,
    wherein the olefin polymer comprises a higher molecular weight component and a lower molecular weight component,
    wherein the dual catalyst system comprises a first metallocene catalyst component and a second metallocene catalyst component, and
    wherein the polymerization conditions comprise a reaction temperature and a dual catalyst system residence time; and
    (2) controlling a weight ratio of the higher molecular weight component to the lower molecular weight component by adjusting the reaction temperature and/or the dual catalyst system residence time, wherein the weight ratio of the higher molecular weight component to the lower molecular weight component increases as the reaction temperature increases.

2. The process of claim 1, wherein the weight ratio of the higher molecular weight component to the lower molecular weight component increases as the catalyst system residence time increases.

3. The process of claim 1, wherein the polymerization reactor system comprises a slurry reactor, a gas-phase reactor, a solution reactor, or a combination thereof.

4. The process of claim 1, wherein the polymerization reactor system comprises a single reactor.

5. The process of claim 1, wherein the olefin monomer comprises ethylene and the olefin comonomer comprises a $C_3$-$C_{10}$ alpha-olefin.

6. The process of claim 1, further comprising the steps of:
    determining the weight ratio of the higher molecular weight component to the lower molecular weight component; and
    adjusting the reaction temperature and/or the dual catalyst system residence time based on the difference between the determined weight ratio and a target weight ratio.

7. The process of claim 1, wherein the first metallocene catalyst component and the second metallocene catalyst component independently comprise titanium, zirconium, hafnium, or a combination thereof.

8. The process of claim 1, wherein the weight ratio of the first metallocene catalyst component to the second metallocene catalyst component is in a range of from about 1:10 to about 10:1.

9. The process of claim 1, wherein the weight ratio of the first metallocene catalyst component to the second metallocene catalyst component is substantially constant.

10. A method of controlling a weight ratio of a higher molecular weight component to a lower molecular weight component of an olefin polymer, the method comprising:
    (i) contacting a dual catalyst system with an olefin monomer and an olefin comonomer in a polymerization reactor system under polymerization conditions to produce the olefin polymer,
    wherein the dual catalyst system comprises a first metallocene catalyst component and a second metallocene catalyst component, and
    wherein the polymerization conditions comprise a reaction temperature and a dual catalyst system residence time; and
    (ii) adjusting the reaction temperature and/or the dual catalyst system residence time to control the weight ratio of the higher molecular weight component to the lower molecular weight component, wherein the weight ratio of the higher molecular weight component to the lower molecular weight component increases as the reaction temperature increases.

11. The method of claim 10, wherein the weight ratio of the higher molecular weight component to the lower molecular weight component is in a range from about 1:10 to about 10:1.

12. The method of claim 10, further comprising:
    a step of adjusting the weight ratio of the first metallocene catalyst component to the second metallocene catalyst component;

a step of adding hydrogen to the polymerization reactor system to adjust a molecular weight parameter and/or the melt index (MI) of the polymer; or both.

13. The method of claim 10, wherein the dual catalyst system comprises a first metallocene catalyst component, a second metallocene catalyst component, an activator, and an optional co-catalyst.

14. A process for producing an olefin polymer with a target weight ratio of a higher molecular weight component to a lower molecular weight component, the process comprising:
(a) contacting a dual catalyst system with an olefin monomer and an olefin comonomer in a polymerization reactor system under polymerization conditions,
wherein the dual catalyst system comprises a first metallocene catalyst component and a second metallocene catalyst component, and
wherein the polymerization conditions comprise a reaction temperature and a dual catalyst system residence time; and
(b) controlling the reaction temperature and/or the dual reactor catalyst system residence time to produce the olefin polymer with the target weight ratio of the higher molecular weight component to the lower molecular weight component.

15. The process of claim 14, wherein:
the first metallocene catalyst component produces the lower molecular weight component and comprises zirconium; and
the second metallocene catalyst component produces the higher molecular weight component and comprises zirconium and/or hafnium.

16. The process of claim 14, wherein:
the reaction temperature is in a range from about 80° C. to about 105° C.;
the residence time is in a range from about 15 min to about 90 min;
a reactor % solids is in a range from about 30 to about 55 wt. %; or any combination thereof.

17. The process of claim 14, wherein the olefin polymer comprises an ethylene copolymer, and the density of the ethylene copolymer is controlled by:
adjusting a molar ratio of ethylene to the olefin comonomer; and
adjusting the weight ratio of the higher molecular weight component to the lower molecular weight component.

18. A polymerization process, the process comprising:
(1) contacting a dual catalyst system with an olefin monomer and an olefin comonomer in a polymerization reactor system under polymerization conditions to produce an olefin polymer,
wherein the olefin polymer comprises a higher molecular weight component and a lower molecular weight component,
wherein the dual catalyst system comprises a first transition metal compound, a second transition metal compound, and an activator-support,
wherein the activator-support comprises fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or any combination thereof, and
wherein the polymerization conditions comprise a reaction temperature and a dual catalyst system residence time; and
(2) controlling a weight ratio of the higher molecular weight component to the lower molecular weight component by adjusting the reaction temperature and/or the dual catalyst system residence time, wherein the weight ratio of the higher molecular weight component to the lower molecular weight component increases as the reaction temperature increases.

19. The process of claim 18, wherein the dual catalyst system comprises a first transition metal compound, a second transition metal compound, an activator-support, and a co-catalyst.

20. The process of claim 1, wherein:
the dual catalyst system comprises a first metallocene catalyst component, a second metallocene catalyst component, an activator, and an optional co-catalyst, wherein the activator comprises an activator-support, an aluminoxane compound, an organoboron or organoborate compound, an ionizing ionic compound, or a combination thereof;
the olefin monomer comprises ethylene and the olefin comonomer comprises 1-butene, 1-hexene, 1-octene, or a mixture thereof;
the first metallocene catalyst component and the second metallocene catalyst component independently comprise titanium, zirconium, hafnium, or a combination thereof; and
the polymerization reactor system comprises a slurry reactor, a gas-phase reactor, a solution reactor, or a combination thereof.

21. The process of claim 20, wherein:
the activator comprises an aluminoxane compound;
the first metallocene catalyst component comprises an unbridged zirconium based metallocene compound; and
the second metallocene catalyst component comprises a zirconium or hafnium based bridged metallocene compound.

22. The process of claim 20, wherein the dual catalyst system comprises:
a first metallocene catalyst component comprising an unbridged zirconium based metallocene compound;
a second metallocene catalyst component comprising a zirconium or hafnium based bridged metallocene compound;
an activator-support comprising a solid oxide treated with an electron-withdrawing anion; and
an organoaluminum compound.

23. The process of claim 20, wherein the weight ratio of the higher molecular weight component to the lower molecular weight component increases as the catalyst system residence time increases.

24. The method of claim 11, wherein:
the dual catalyst system comprises a first metallocene catalyst component, a second metallocene catalyst component, an activator, and a co-catalyst;
the olefin monomer comprises ethylene and the olefin comonomer comprises a $C_3$-$C_{10}$ alpha-olefin; and
the first metallocene catalyst component and the second metallocene catalyst component independently comprise titanium, zirconium, hafnium, or a combination thereof.

25. The method of claim 24, wherein:
the activator comprises an aluminoxane compound, an activator-support comprising a solid oxide treated with an electron-withdrawing anion, or a combination thereof.

26. The method of claim 25, wherein:
the first metallocene catalyst component comprises an unbridged zirconium based metallocene compound;
the second metallocene catalyst component comprises a zirconium or hafnium based bridged metallocene compound; and
the weight ratio of the higher molecular weight component to the lower molecular weight component increases as the catalyst system residence time increases.

27. The process of claim 14, wherein:
the dual catalyst system comprises a first metallocene catalyst component, a second metallocene catalyst component, an activator, and an optional co-catalyst, wherein the activator comprises an activator-support, an aluminoxane compound, an organoboron or organoborate compound, an ionizing ionic compound, or a combination thereof;
the olefin monomer comprises ethylene and the olefin comonomer comprises 1-butene, 1-hexene, 1-octene, or a mixture thereof;
the first metallocene catalyst component and the second metallocene catalyst component independently comprise titanium, zirconium, hafnium, or a combination thereof;
the weight ratio of the higher molecular weight component to the lower molecular weight component increases as the reaction temperature increases; and
the weight ratio of the higher molecular weight component to the lower molecular weight component increases as the catalyst system residence time increases.

28. The process of claim 27, wherein:
the target weight ratio of the higher molecular weight component to the lower molecular weight component is in a range from about 1:10 to about 10:1; and
the dual catalyst system comprises a first metallocene catalyst component comprising an unbridged zirconium based metallocene compound; a second metallocene catalyst component comprising a zirconium or hafnium based bridged metallocene compound; an activator-support comprising a fluorided solid oxide, a sulfated solid oxide, or a combination thereof; and an organoaluminum compound.

29. The process of claim 19, wherein:
the olefin monomer comprises ethylene and the olefin comonomer comprises 1-butene, 1-hexene, 1-octene, or a mixture thereof;
the dual catalyst system comprises an organoaluminum co-catalyst;
the polymerization reactor system comprises a slurry reactor, a gas-phase reactor, a solution reactor, or a combination thereof; and
the weight ratio of the higher molecular weight component to the lower molecular weight component increases as the catalyst system residence time increases.

* * * * *